United States Patent
Rowe et al.

(10) Patent No.: US 8,392,506 B2
(45) Date of Patent: Mar. 5, 2013

(54) NETWORKED GAMING SYSTEM INCLUDING A LOCATION MONITOR AND DISPATCHER USING PERSONAL DATA KEYS

(75) Inventors: Bruce Rowe, Las Vegas, NV (US); John Giobbi, Bend, OR (US); Bryan Kelly, Pleasanton, CA (US); Robert Hendrickson, Sea Girt, NJ (US); Dave Barker, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 845 days.

(21) Appl. No.: 12/269,782

(22) Filed: Nov. 12, 2008

(65) Prior Publication Data

US 2009/0239667 A1   Sep. 24, 2009

Related U.S. Application Data

(60) Provisional application No. 60/987,218, filed on Nov. 12, 2007.

(51) Int. Cl.
*G06F 21/00* (2006.01)
*G06F 15/16* (2006.01)
*H04L 9/32* (2006.01)

(52) U.S. Cl. ........ 709/205; 713/182; 713/185; 713/186; 713/168

(58) Field of Classification Search .................. 709/205, 709/217–228; 713/151–194
See application file for complete search history.

(56) References Cited

U.S. PATENT DOCUMENTS

| | | | | |
|---|---|---|---|---|
| 7,883,003 | B2 * | 2/2011 | Gobbi et al. | 235/376 |
| 7,904,718 | B2 * | 3/2011 | Giobbi et al. | 713/172 |
| 2006/0136742 | A1 * | 6/2006 | Giobbi | 713/185 |
| 2007/0159301 | A1 * | 7/2007 | Hirt et al. | 340/10.1 |
| 2007/0159994 | A1 * | 7/2007 | Brown et al. | 370/324 |
| 2007/0174809 | A1 * | 7/2007 | Brown et al. | 717/100 |
| 2007/0207750 | A1 * | 9/2007 | Brown et al. | 455/127.5 |
| 2007/0243935 | A1 * | 10/2007 | Huizinga | 463/42 |
| 2007/0245158 | A1 * | 10/2007 | Giobbi et al. | 713/186 |
| 2007/0260883 | A1 * | 11/2007 | Giobbi et al. | 713/168 |
| 2007/0260888 | A1 * | 11/2007 | Giobbi et al. | 713/186 |
| 2008/0040609 | A1 * | 2/2008 | Giobbi | 713/182 |
| 2008/0090645 | A1 * | 4/2008 | Walker et al. | 463/25 |
| 2008/0149705 | A1 * | 6/2008 | Giobbi et al. | 235/376 |
| 2008/0150678 | A1 * | 6/2008 | Giobbi et al. | 340/5.2 |

* cited by examiner

*Primary Examiner* — Haresh N Patel
(74) *Attorney, Agent, or Firm* — J. P. Cody, Esq; Philip J. Anderson, Esq

(57) ABSTRACT

A networked gaming system is disclosed that includes location detection and dispatcher servers operative together with one or more wireless personal digital (PDK) devices communicating with receiver/decoders (RDCs) for tracking and communicating with casino employees and patrons throughout the casino. An employee and patron tracking system in a casino is disclosed wherein beverage and other service staff are properly assigned, dispatched to the right patron or location and can be located and tracked throughout various transactions.

11 Claims, 28 Drawing Sheets

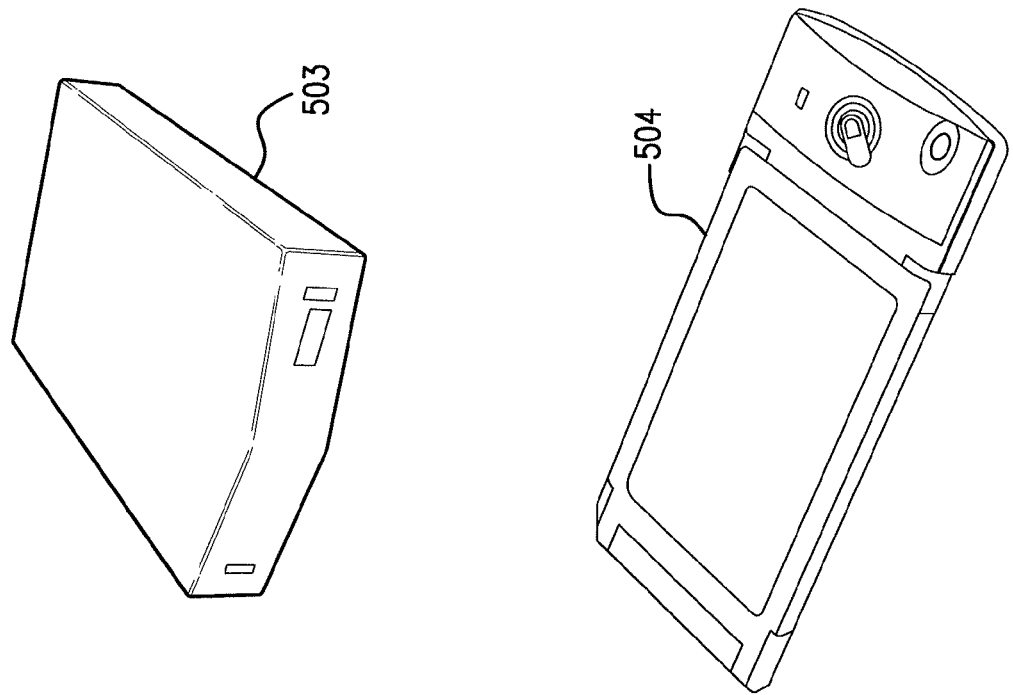
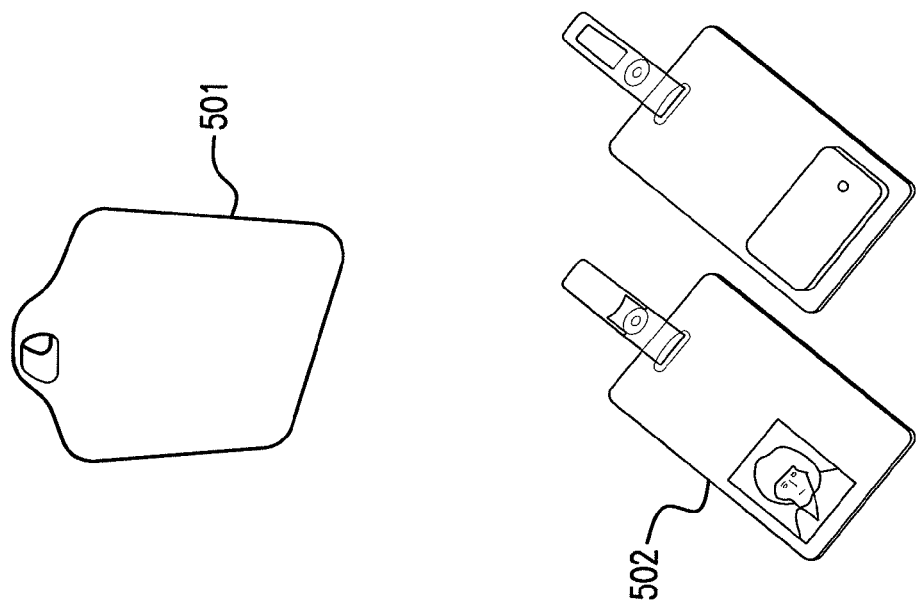
FIG.5

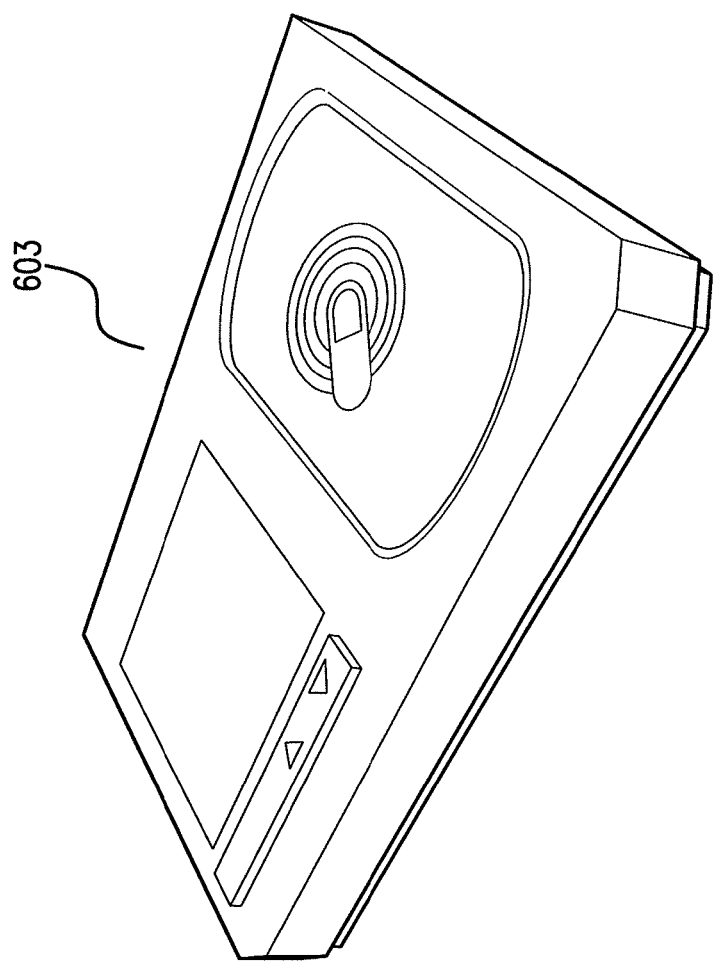
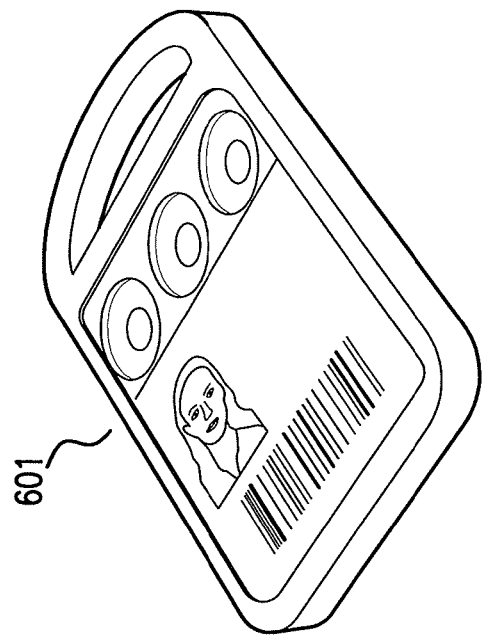
FIG.6

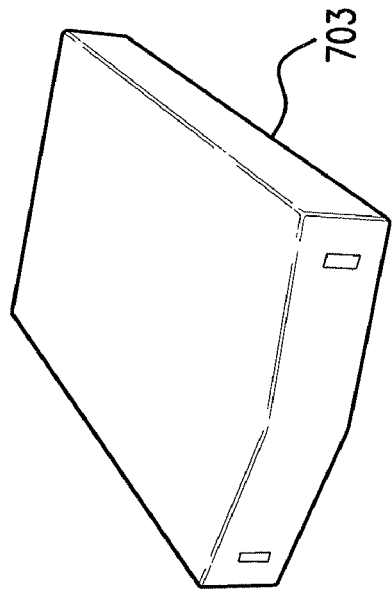
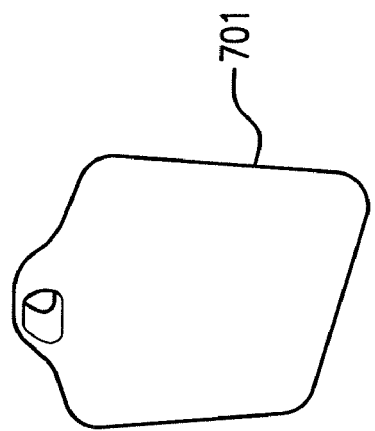
FIG.7

Real Time Customer Experience Management

| Real Time Slot Service RTSS | Real Time Food and Beverage RTFNB | Real Time Valet Parking RTVP | Real Time Player Host RTPH | Real Time Customer Marketing RTCM | Real Time Customer Service RTCS | Real Time Knowledge Management RTKM |
|---|---|---|---|---|---|---|
| Reel Tilt<br>General Tilt<br>Jackpot<br>Cashout<br>Request Attend<br>Prog. Jackpot<br>CI Jam<br>CI Rev<br>CI Long<br>CI Tilt<br>BV Optic<br>BV Stack Jam<br>BV Com Err<br>BV Pay Jam<br>Cash Box Full<br>Paper Out<br>Paper Jam<br>Printer error | Request for Service<br>Drinks<br>Food<br>Cigarettes<br>Order at the Slot<br>Drinks<br>Food<br>Cigarettes<br>Interface to iView<br>Interface to Micros<br>Process credit card | Request for Service<br>Car arrival<br>Lost ticket<br>Order at the Slot<br>Car retrieval<br>Lost ticket<br>Interface to iView<br>Process credit card | Patron Profile<br>Player Club sign-up<br>DL Scan<br>Manage preferences<br>Drinks<br>Cigarettes<br>Mailings<br>Promo Offers<br>Points check<br>Promo/Merchandise | Player Interaction<br>Meet and Greet<br>Celebration<br>Birthday<br>Anniversary<br>Tier Upgrade<br>Marketing<br>Decliner<br>Promo Response<br>Signage<br>Available machines<br>Current payouts<br>Retail Advertising<br>Race Results | Bill Breaker Kiosk<br>Ticket Redemption Kiosk<br>Cage Transactions<br>Service Recovery<br>Alerts<br>Patron Paging<br>Horse Bet Runner<br>Track Box Reserves<br>Hotel Reservations<br>Special Events<br>Slot Machine CAP<br>Spouse Location<br>Win/Loss Tax Reports | Electronic signage<br>iView Flash<br>LCD Panels<br>Machine Availability<br>Sportsbook Results<br>Table Game Seating<br>Real Time Staffing<br>Service Metrics<br>Service Alerts<br>Yield Management<br>Employee Performance<br>Mgr/Supervisor Performance |

FIG.9

Real Time Slot Service's Managed
Rules-Based Process

Right Click for Detailed Zone Scoreboard

| ZONE 2 | | ZONE 3 | | ZONE 4 | |
|---|---|---|---|---|---|
| VIP Count | 8 | VIP Count | 52 | VIP Count | 19 |
| Carded Players | 16 | Carded Players | 8 | Carded Players | 14 |
| No Card Players | 12 | No Card Players | 6 | No Card Players | 7 |
| Slot Attends | 2 | Slot Attends | 2 | Slot Attends | 2 |
| Bev Servers | 2 | Bev Servers | 2 | Bev Servers | 2 |
| VIP/Slot Attnd | 4 | VIP/Slot Attnd | 26 | VIP/Slot Attnd | 8.5 |
| VIP/Bev Server | 4 | VIP/Bev Server | 26 | VIP/Bev Server | 8.5 |
| Player/Slot Attend | 18 | Player/Slot Attend | 33 | Player/Slot Attend | 20 |
| Player/Bev Serv | 18 | Player/Bev Serv | 33 | Player/Bev Serv | 20 |
| Open Event/Bev | 3 | Open Event/Bev | 6 | Open Event/Bev | 2 |
| Open Event/Slot | 0 | Open Event/Slot | 4 | Open Event/Slot | 2 |
| VIP Bev Serv Trgt | 1.5 | VIP Bev Serv Trgt | 3.0 | VIP Bev Serv Trgt | 1.5 |
| VIP Slot Serv Trgt | 1.0 | VIP Slot Serv Trgt | 1.7 | VIP Slot Serv Trgt | 1.2 |

OK

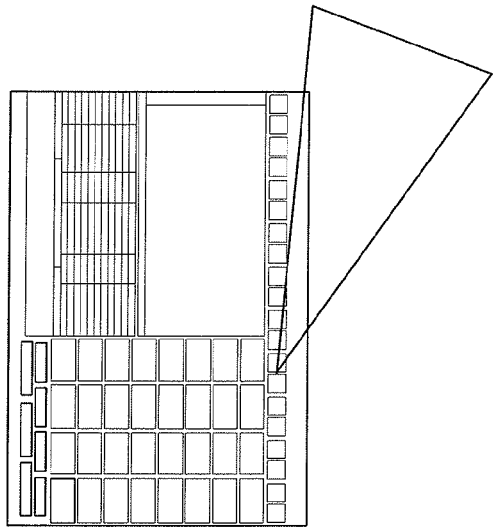

FIG. 15

Service Recovery Alerts Management Alerts

| Location | Card # | Tier | Name | Date/Time | Respond | Complete | Total | Event | Amount | Employee | Employee # |
|---|---|---|---|---|---|---|---|---|---|---|---|
| 01ND12 | 1400062526 | NUL | NANCY KOPP | 3/5/06 9:32 PM | 7:01 | 3:23 | 10:24 | BILL JAM | | GWENDOLYN SCALES | 3965 |
| 02FA02 | 1400863498 | SILVER | RICHARD SHIH | 3/5/06 9:55 AM | 6:16 | 2:05 | 8:21 | JACKPOT | $937.50 | YOLANDA KIZIER | 1924 |
| 01NA09 | 1401155664 | VIP | JIM JOHNSTON | 3/5/06 10:00 PM | 5:14 | 7:50 | 13:04 | PPR OUT | | TERI D. DALBY | 6803 |
| 01ND12 | 1401233667 | SILVER | GIL ARDENT | 3/5/06 9:48 PM | 4:00 | 6:15 | 10:15 | JACKPOT | $122.60 | YOLANDA GIPSON | 8850 |
| 02BD24 | 1400153954 | GOLD | SUSAN DOYLE | 3/5/06 9:35 PM | 3:49 | 4:11 | 8:00 | JACKPOT | $1,745.60 | DEMETRIUS JACKSON | 6123 |
| 02BA05 | 1401187993 | NUL | ART DUNCON | 3/5/06 9:30 PM | 3:20 | 6:50 | 10:10 | JACKPOT | $812.00 | TERRY BELLE | 2470 |

SERVICE RECOVERY ALERT
VIP - Mr. Jim Johnston
PAPER OUT
5:00 Min Response @ 10:00 PM
Now Playing at 01NC12
Use Serv Req KIY #5

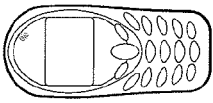
Supervisor Cell Phone

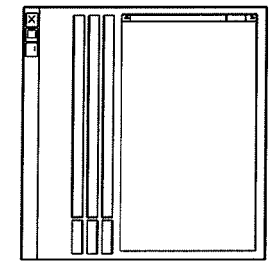
Shift Manager Email

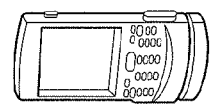
Ambassador Handheld

FIG. 17

Detailed "Curb to Curb"
Customer Experience History

Name: John Williams
Tier: VIP
Rating Level: 12
Theo: $ 5,627
Last Visit: 9/13/06

| TIME | LOCATION | DESCRIPTION |
|---|---|---|
| 12:22 PM | VLT #1 | VALET CHECK-IN |
| 12:30 PM | A-1235 | DRINK REQUEST |
| 12:32 PM | A-1235 | DRINK REQ RESPONSE |
| 12:36 PM | A-1235 | DRINK REQ COMPLETE |
| 12:56 PM | B-3421 | PAPER JAM |
| 1:10 PM | B-3421 | SLOT HOST RESPONSE |
| 1:12 PM | B-3421 | SLOT HOST COMPLETE |
| 1:16 PM | A-2323 | SRVC RECOVERY |
| 1:18 PM | A-2323 | SRVC REC RESPONSE |
| 1:19 PM | A-2323 | BUFFET COMP ISSUED |
| 1:19 PM | A-2323 | SRVC REC COMPLETE |
| 1:33 PM | A-9949 | JACKPOT $2,432 |
| 1:35 PM | A-9949 | SLOT HOST RESPONSE |
| 1:39 PM | A-9949 | SLOT HOST COMPLETE |
| 2:04 PM | EAST #1 | BUFFET ENTRANCE |

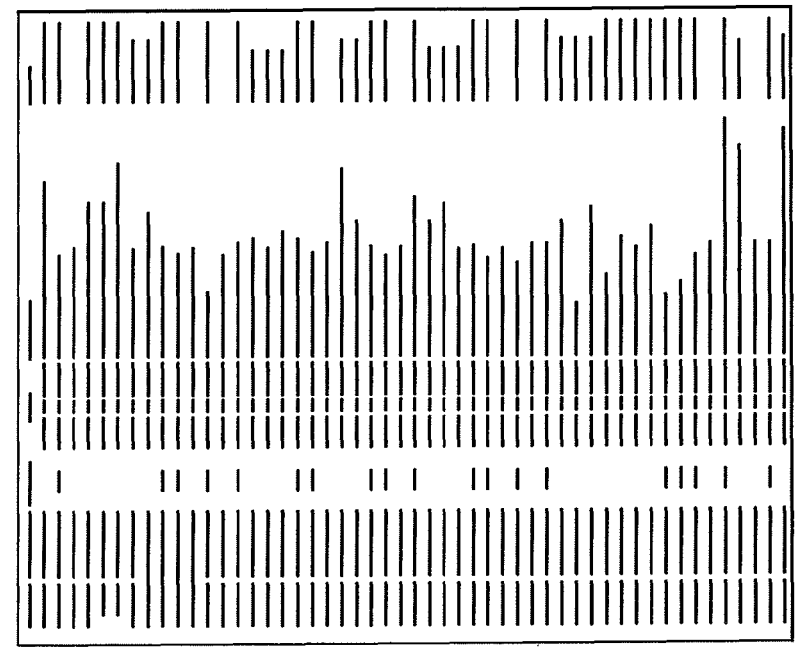

FIG. 23

NETWORKED GAMING SYSTEM INCLUDING A LOCATION MONITOR AND DISPATCHER USING PERSONAL DATA KEYS

CROSS REFERENCE TO RELATED APPLICATIONS

This application claims priority from U.S. provisional patent application 60/987,218 filed on Nov. 12, 2007, hereby incorporated by reference in its entirety for all purposes.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of the Invention

This invention pertains generally to networked gaming systems, and more particularly to a networked gaming system with proximity detection for use with player services and other casino-related activities.

2. Description of Related Art

It has long been recognized in business generally, that the ability to deliver the right employee to the right customer at the right time is a necessary component of delivering good customer service. The ability to prove that an employee is where he/she says they are and the locating that employee in association with a previously triggered event are critical to deliver good customer server.

In the medical services field, ambulance dispatch systems are used in many cities which allow for the ambulances to be properly positioned throughout the city in the proper locations based upon historical events. The dispatch service can properly deliver the correct ambulance (one not in use, one with an emergency medical technician (EMT), or one with a Paramedic) depending on the event that was called in. This proper allocation of the right ambulance staff to the right patient in the quickest way is what saves many lives and leads to many happy patients.

Similarly in casino operations, there is a need for the ability to deliver the right employee to the right customer at the right time. There is also a need for casino operators to be able to identify and monitor locations of employees and to be able to dispatch employees efficiently and effectively within the facility.

SUMMARY

In accordance with one or more aspects of the invention, a networked gaming system includes location detector and dispatch servers operative together with one or more wireless personal digital key (PDK) devices communicating with receiver/decoders (RDCs) for use in tracking and communicating with patrons and casino employees throughout the casino, facilitating the delivery of services to patrons, and monitoring employee activities.

BRIEF DESCRIPTION OF THE DRAWINGS

FIG. 5 illustrates various form factors that the PDK (personal digital key) and RDG (receiver/decoder circuits) can take in accordance with one or more embodiments.

FIG. 6 illustrates the PDK issued to an employee and casino patron in the form of FOB with labeled buttons provided to trigger different events for the person holding this PDK in accordance with one or more embodiments.

FIG. 7 illustrates a bi-directionally connected PDK and RDC in proximity to each other in accordance with one or more embodiments.

FIG. 9 illustrates the features of the real-time dispatch system that will be integrated into the proximity location tracking system to provide better service for all of the areas in accordance with one or more embodiments.

FIG. 15 illustrates a WRG employee dispatch service application in accordance with one or more embodiments.

FIG. 17 illustrates a WRG employee dispatch service application showing service recovery alerts and management alerts in accordance with one or more embodiments.

FIG. 23 illustrates a transaction display for a specific casino VIP patron in accordance with one or more embodiments.

DETAILED DESCRIPTION OF THE EMBODIMENTS

Figure 1A:
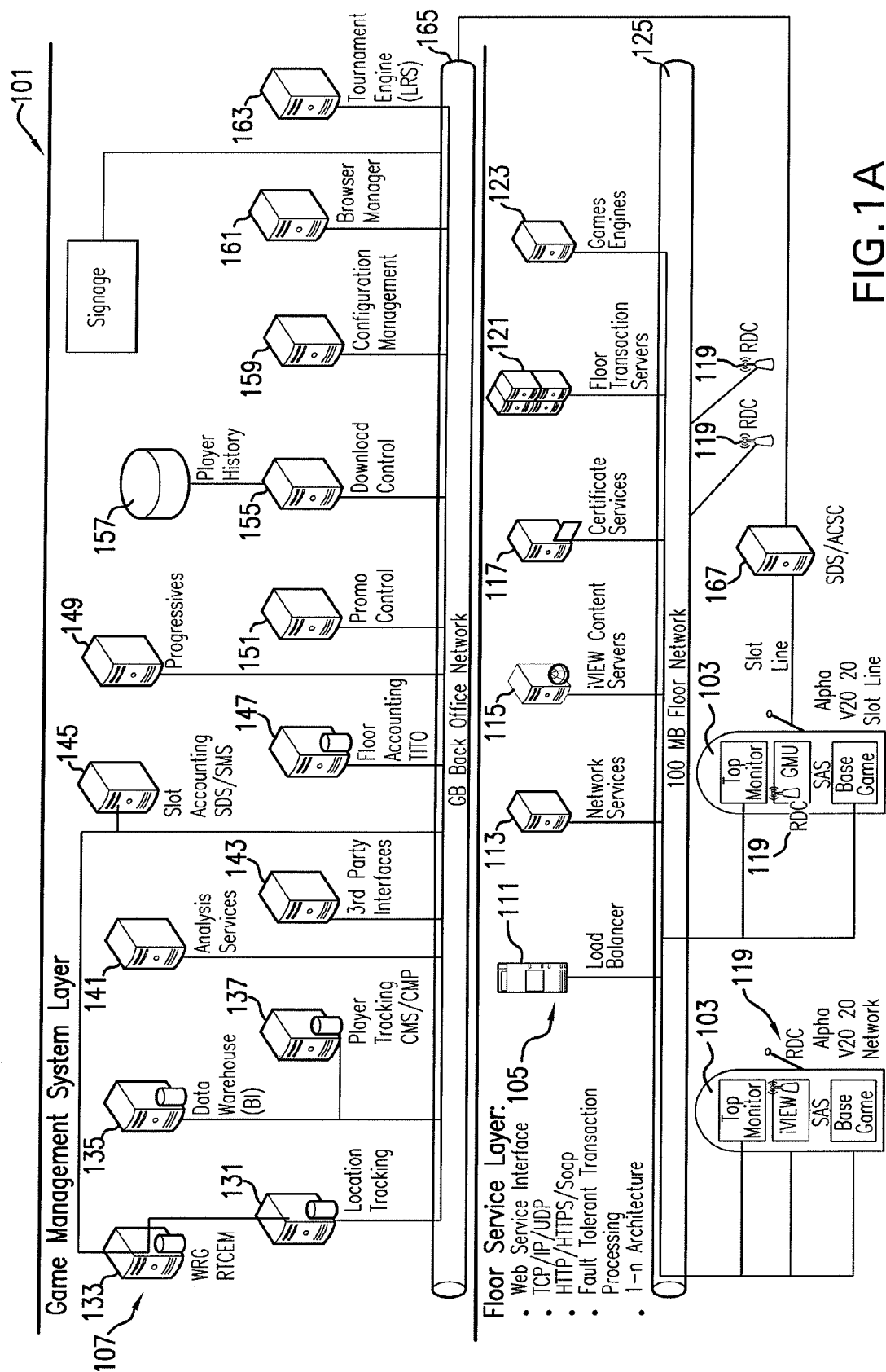
FIG. 1A illustrates a networked gaming system with an integrated location tracking system in accordance with one or more embodiments.

Various embodiments are directed to a proximity detection system includes a real-time dispatch and monitoring system and is integrated with a networked gaming system. In one or more aspects, the integrated system provides the ability to make the beverage dispatch service more efficient in a casino by adding location tracking personal digital keys that are held by beverage hosts. The beverage host is able to find and locate casino patrons and deliver the requested beverage. The host is then able to officially close the transaction by the press of a button on the wireless personal digital key. Other uses of employee location tracking in the casino are described within.

The embodiments are illustrated and described herein, by way of example only, and not by way of limitation. Referring now to the drawings, and more particularly to FIGS. 1-23, there are shown illustrative examples of various gaming machines and networked gaming systems including proximity detection technology. One or more networked gaming systems include one or more user control stations where GUI displays may be generated by an operator, an employee station, and handheld units which may be used to monitor and direct employee activity, such as facilitating services to patrons, in accordance with various aspects of the invention utilizing the proximity technology.

Figure 1B:
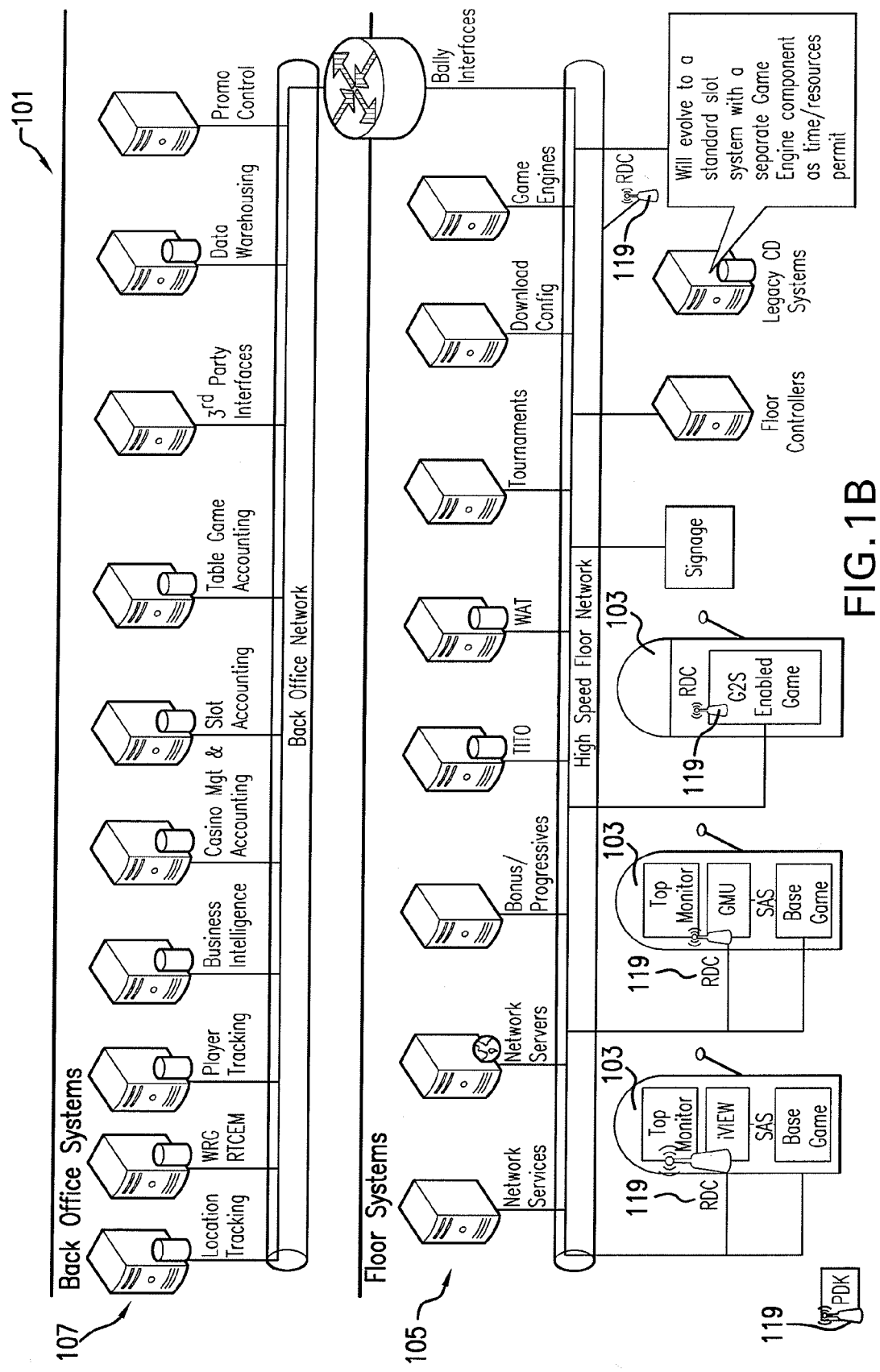
FIG. 1B illustrates an alternate embodiment of a networked gaming system with an integrated location tracking system in accordance with one or more embodiments.

Referring to FIGS. 1A and 1B, enterprise gaming system 101 is shown in accordance with one or more embodiments. Enterprise gaming system 101 may include one casino or multiple locations and generally includes a network of gaming machines 103, floor management system (SMS) 105, and casino management system (CMS) 107. SMS 105 may include load balancer 111, network services servers 113, player interface (iView) content servers 115, certificate services server 117, radio receiver/decoder devices (RDC) 119, floor transaction servers 121, game engines 123, each of which may connect over network bus 125 to gaming machines 103. CMS 107 may include location tracking server 131, real-time dispatch server 133, data warehouse server 135, player tracking server 137, analysis services server 141, third party interface server 143, slot accounting server 145, floor accounting server 147, progressives server 149, promotions control server 151, a bonus game (such as Bally Live Rewards) server (not shown), download control server 155, player history database 157, configuration management server 159, browser manager 161, and tournament engine server 163 connecting through bus 165 to server host 167 and gaming machines 103. The servers may comprise commercially available personal computers, such as Dell, Hewlett Packard, or Sony manufactured personal computers or servers, or work stations, such as Sun manufactured work stations, which may by example use Microsoft Windows, NT, Unix, or Unix-based open source operating systems. Each of the servers include memory wherein executable programming is stored for performing the specialized functions assigned to the respective servers and communicating with the other network devices such as in accordance with SAS, G2S, or other protocols which may be promulgated by the Gaming Standards Association. The various servers and gaming machines 103 may connect to the network with various conventional network connections (such as USB, serial, parallel, RS485, Ethernet connections). Additional servers which may be incorporated with CMS 107 include a responsible gaming limit server (not shown), advertisement server (not shown), and a control station server (not shown) where an operator or authorized personnel may select options and input new programming to adjust each of the respective servers and gaming machines 103. SMS 105 may also have additional servers including a control station (not shown) through which authorized personnel may select options, modify programming, and obtain reports of the connected servers and devices, and obtain reports.

The various CMS and SMS servers are descriptively entitled to reflect the functional executable programming stored thereon and the nature of databases maintained and utilized in performing their respective functions. As may be noted from FIGS. 1A and 1B, networked gaming system 101 may have various configurations of servers and components connecting as part of either SMS 105 or CMS 107 wherein like-numbered elements may serve over the network in the same or similar capacity and function. For example, bus capacity over SMS 105 may be more efficiently utilized by one server versus another server depending upon the demands on bus 165 by CMS 107. As may be noted in the example of FIG. 1A, bus 125 supporting communications over SMS 105 has a 100 MB bandwidth versus bus 165 supporting communications over CMS 107 which has a GB bandwidth, so it may be desirable to associate download and configuration servers 155 and 159 with CMS 107 in one embodiment (see FIG. 1A) or with SMS 105 in another embodiment (see FIG. 1B) to accommodate bandwidth demands.

Enterprise gaming system 101 includes an integrated location tracking and dispatch system that includes location tracking application and real-time dispatch servers 131, 133, such as commercially available William Ryan Group servers that may be modified to provide various customer and employee-related services. As part of the integrated system, radio receiver/decoder devices 119 are integrated randomly throughout the casino and within EGMs 103 to detect personal digital keys (PDKs) and transmit the associated information to location tracking server 131 and/or real-time dispatch server 133.

Gaming machines 103 include various peripheral components that may be connected with USB, serial, parallel, RS485, Ethernet devices/architectures to the system components within the respective gaming machine. The game monitoring unit (GMU) may have a connection to the base game through a serial SAS connection. The system components in the gaming cabinet may be connected to the servers using HTTPs over Ethernet. Using CMS 107 and/or SMS 105 servers and devices, firmware, media, operating systems, and configurations may be downloaded to the system components of respective gaming machines for upgrading or managing floor content and offerings in accordance with operator selections or automatically depending upon CMS 107 and SMS 105 master programming. The data and programming updates to gaming machines 103 are authenticated using conventional techniques prior to install on the system components.

In one or more embodiments, two or more data items may be received by location tracking server 131 from the RDC location response records transmitted by a given RDC device 119, including: the PDK identifiers and an associated RSSI (received signal strength indicator) values. Other information may also be contained within the location response records. For example, RDC device 119 may include an RDC identifier as part of a transmitted PDK location signal. The tracking of a PDK may be done algorithmically. This includes ranging (upper and lower bounds), smoothing, averaging, handling signal drop-outs and neighbor comparisons.

Figure 1C:
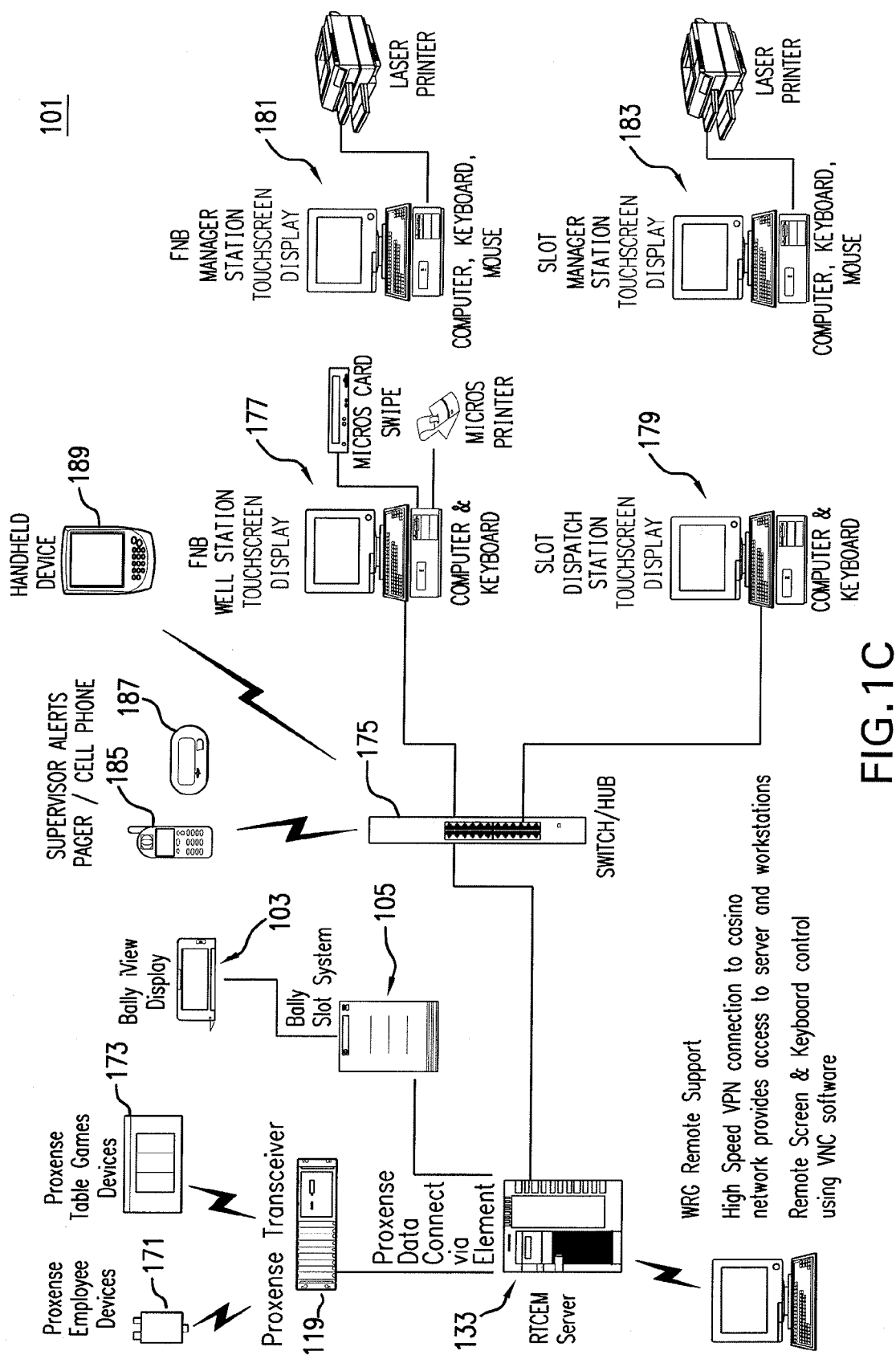
FIG. 1C illustrates a network diagram of the integrated proximity detection system integrated into the William Ryan Group RTCEM real-time transaction system and the Bally Slot system in accordance with one or more embodiments.

Referring to FIG. 1C, networked gaming system 101 is shown in part with respect to the integrated proximity detection system in accordance with one or more embodiments. The various components required to perform real-time monitoring and dispatch of casino services to patrons using PDKs is shown. In the illustration, dispatch server 133 is shown connected to RDC 119, such as a commercially available Proxense transceiver, for receiving radio locator signals from employee locator devices 171 and gaming table locator devices 173 containing PDK transponders compatible for recognition by RDC 119. Dispatch server 133 is also connected through SMS 105 to each EGM 103 and their respective RDC 119 and connected through switch/hub 175 to food and beverage station 177 and slot dispatch station 179 each of which are respectively connected to manager stations 181, 183 for monitoring activity and generating management reports. In addition, handheld devices 185, 187, 189, such as commercially available radios, Blackberry phones/transceivers, and personal data assistant communicators (such as a Palm PDA), may be programmed to connect wirelessly through switch/hub 175 for receiving and transmitting information to stations 177, 179.

Figure 2:
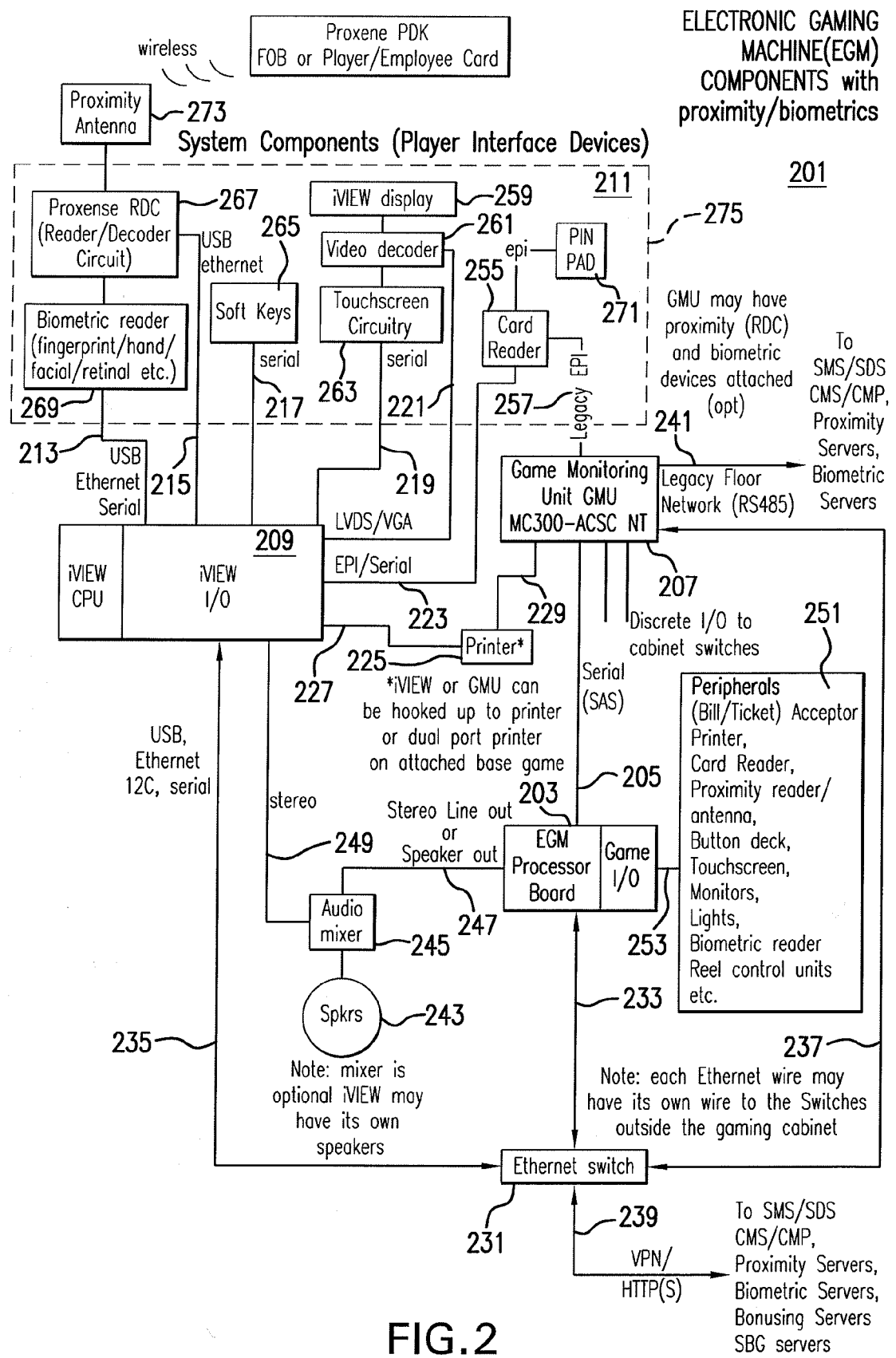
FIG. 2 illustrates a component diagram of an electronic gaming machine (EGM) combined with radio-decoder proximity detection circuitry in accordance with one or more embodiments.

Referring to FIG. 2, electronic gaming machine 201 is shown with an RDC including PDK proximity detector components in accordance with one or more embodiments. Electronic gaming machine 201 includes base game integrated circuit board 203 (EGM Processor Board) connected through serial bus line 205 to game monitoring unit (GMU) 207 (such as Bally MC300-ACSC NT), and player interface integrated circuit board (PIB) 209 connected to player interface devices 211 over bus lines 213, 215, 217, 219, 221, 223. Printer 225 is connected to PIB 209 and GMU 207 over bus lines 227, 229. EGM Processor Board 203, PIB 209, and GMU 207 connect to Ethernet switch 231 over bus lines 233, 235, 237. Ethernet switch 231 connects to a slot management system (SMS) and a casino management system (CMS) network over bus line 239. GMU 207 also may connect to the SMS and CMS network over bus line 241. Speakers 243 connect through audio mixer 245 and bus lines 247, 249 to EGM Processor Board 203 and PIB 209. Peripherals 251 connect through bus 253 to EGM Processor Board 203. The various components and included devices may be installed with conventionally and/or commercially available components, devices, and circuitry into a conventional and/or commercially available gaming machine cabinet. The PDK proximity detection components may be installed by upgrading a commercially available PIB 209, such as a Bally iView unit. Coding executed on EGM Processor Board 203, PIB 209, and/or GMU 207 may be upgraded to integrate the PDK proximity detection components and utilize the information as is more fully described herein.

EGM Processor Board 203 includes a game microprocessor, such as an Intel Pentium, and memory which may both be onboard memory, such as cache, ROM, EEPROM, and, off-board memory, such as flash or hard drive memory which may connect through serial or parallel ports. Gaming operating system and game software are stored in the memory and executable by the game microprocessor for executing gaming operations on gaming machine 201 including providing one or more wagering games for a patron.

Additional subroutine and/or function sequences may be initiated on EGM Processor Board 203 prior to or during game activation through the use of signals generated by PDK proximity detection circuitry whereby the presence of an employee PDK may be detected. One or more of the signals may be received by EGM Processor Board 203 from PIB 209 as through Ethernet switch 231 or through some additional path (not shown) such as directly connecting PIB 209 and EGM Processor Board 203, connecting PIB 209 through GMU 207 to EGM Processor Board 203, connecting GMU 207 to EGM Processor Board 203 in the case where GMU 207 may directly receive signals from PDK proximity detection sensors, or connecting EGM Processor Board 203 to directly receive signals from PDK proximity detection sensors.

GMU 207 includes an integrated circuit board and GMU processor and memory including coding for network communications, such as the SAS protocol used for system communications over the network. As shown, GMU 207 may connect to card reader 255 through bus 257 and may thereby obtain player card information and transmit the information over the network through bus 241. Gaming activity information may be transferred by the EGM Processor Board 203 to GMU 207 where the information may be translated into a network protocol, such as SAS, for transmission to a server, such as a player tracking server, where information about a patron's playing activity may be stored in a designated server database.

PIB 209 includes an integrated circuit board, PIB processor, and memory which includes an operating system, such as Windows CE, a player interface program which may be executable by the PIB processor together with various input/output (I/O) drivers for respective devices which connect to PIB 209, such as player interface devices 211, and which may further include various games or game components playable on PIB 209 or playable on a connected network server and PIB 209 is operable as the player interface. PIB 209 connects to card reader 255 through bus 223, display 259 through video decoder 261 and bus 221, such as an LVDS or VGA bus, proximity detector 267 through bus 215, and biometric images 269 through bus 213.

As part of its programming, the PIB processor executes coding to drive display 259 and provide messages and information to a patron. Touch screen circuitry interactively connects display 259 and video decoder 261 to PIB 209, such that a patron may input information and cause the information to be transmitted to PIB 209 either on the patron's initiative or responsive to a query by PIB 209. Additionally soft keys 265 connect through bus 217 to PIB 209 and operate together with display 259 to provide information or queries to a patron and receive responses or queries from the patron. PIB 209, in turn, communicates over the CMS/SMS network through Ethernet switch 231 and busses 235, 239 and with respective servers, such as a player tracking server.

For example, PIB 209 may have coding which is stored in local memory and executable by PIB processor upon insertion of a player card into card reader 255 and follows a sequence such as:

```
Card detected            % A signal from card reader transmits to
                         % PIB 209 upon insertion
Read patron card information % A player card has identifying information
                         % which may be used to identify a
                         % corresponding record in a player
                         % database where player tracking
                         % information is maintained, such as a PIN
                         % number for verifying a patron and the
                         % inserted card.
Access player account    % A msg may be transmitted to a player
                         % tracking server where a player account
                         % database may be maintained and
                         % accessed; the record may be located
                         % using the information from the player
                         % card.
Display patron welcome msg with patron's name.
If patron's account has any information to be displayed,
Display additional information
                         % For example, if patron has accumulated
                         % bonus points or has any bonus or promo
                         % awards, then the display may present
                         % that information.
If player requests access to player's account,
Display query requesting input of PIN number
                         % A virtual key pad may be displayed
                         % upon which the patron may press the
                         % correct sequence of keys or a separate
                         % PIN pad may be used, such as PIN pad
                         % 271. Upon receipt, the input PIN may be
                         % compared with a stored PIN associated
                         % with the patron account. If the input PIN
                         % corresponds then the patron is given
                         % access to the account.
If PIN confirmed,
Display available options % For example, associated with respective
                         % soft keys 265, display bonus awards or
                         % promo credits available and enable
                         % activation of bonus awards or download
                         % of promo credits.
Send transaction msg to EGM Processor Board
effecting any authorized credit transaction
                         % EGM Processor Board 203 controls the
                         % credit meter displayed to patron and
                         % controls release of credits to patron as
                         % through bus 253 connecting to
                         % peripherals 251. Pursuant to the
                         % transaction signal from PIB 209, EGM
                         % Processor Board 203 transmits signal to
                         % credit meter and increases the number
                         % of credits by the authorized amount.
```

PDK proximity detector 267 includes radio proximity antenna 273 connected through bus 275 and emitter/receiver circuitry. PDK proximity detector 267 may utilize conventional radio emitter/receiver technology, whereby a transponder signal may be emitted from a nearby PDK device and a corresponding PDK signal received by PDK proximity detector 267. By example, radio signals may be used to transmit a low power short range signal. If EGM 201 with RDC device 119 is in the vicinity, the signal may be received by proximity detector 267. The information may then be transmitted over bus 215 to PIB 209. Coding may be further implemented based on the power of the received signal. For example, an operator may simply want EGMs 201 to identify employees within a selected distance of respective EGMs 201. Also, the power of the emitters may be used to limit the distance prior to receiving a proximity signal or the circuitry or processor coding may limit analysis of signals within a predetermined received power range, which may for example correspond to a distance of approximately three feet based on transponder power settings of respective PDK devices.

Player interface devices 211 are linked into the virtual private network of the system components in gaming machine 201. The system components include the iVIEW processing board and game monitoring unit (GMU) processing board. These system components may connect over a network to the slot management system (such as a commercially available Bally SDS/SMS) and/or casino management system (such as a commercially available Bally CMP/CMS).

Figure 3:
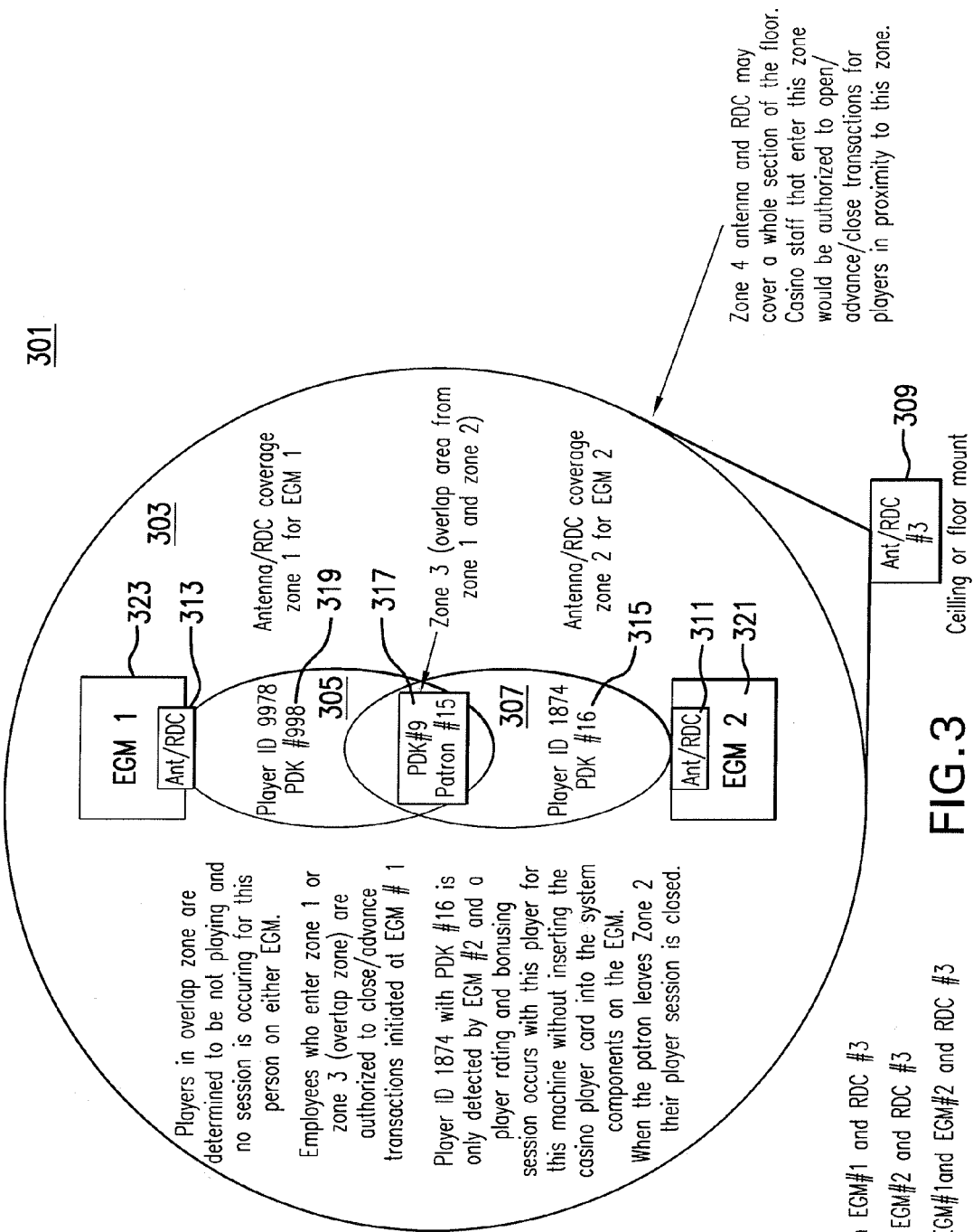
FIG. 3 illustrates the field of coverage of 3 different RDC/antenna's on the casino floor in accordance with one or more embodiments.

Referring to FIG. 3, monitored floor zone 301 is shown with fields of coverage 303, 305, 307 associated with RDCs 309, 311, 313. In the illustration, player PDKs 315, 317, 319 are detected. PDKs 315, 317 are identified by proximity to EGMs 321, 323 as engaging in an active gaming session. PDK 317 is within the remote area of fields 305, 307 of RDCs 311, 313, and is also inside the area of field 303 of RDC 309. RDC 309 may be located on ceiling or floor mounted. With this zone determination a patron can be determined to be a player, an employee, or an observer. For example, players who are located in overlap zones may be determined not to be playing and no gaming session is determined to occur. Employees who are identified within a field may be authorized to close and/or advance transactions initiated at a respective EGM. By example, a player with PDK 16 may be identified through RDC 311 as being associated with Player ID 1874. The player rating and bonusing session occurs with this player for EGM 321 without requiring a player card to be inserted into the card reader. When the player leaves the vicinity of EGM 321, RDC 311 will no longer receive the signal from PDK 315 and the gaming session will be closed. Employees entering field 303 may be identified by any of the respective RDCs and authorized through the network to open, advance, and/or close transactions with patrons identified within the field.

Figure 4:
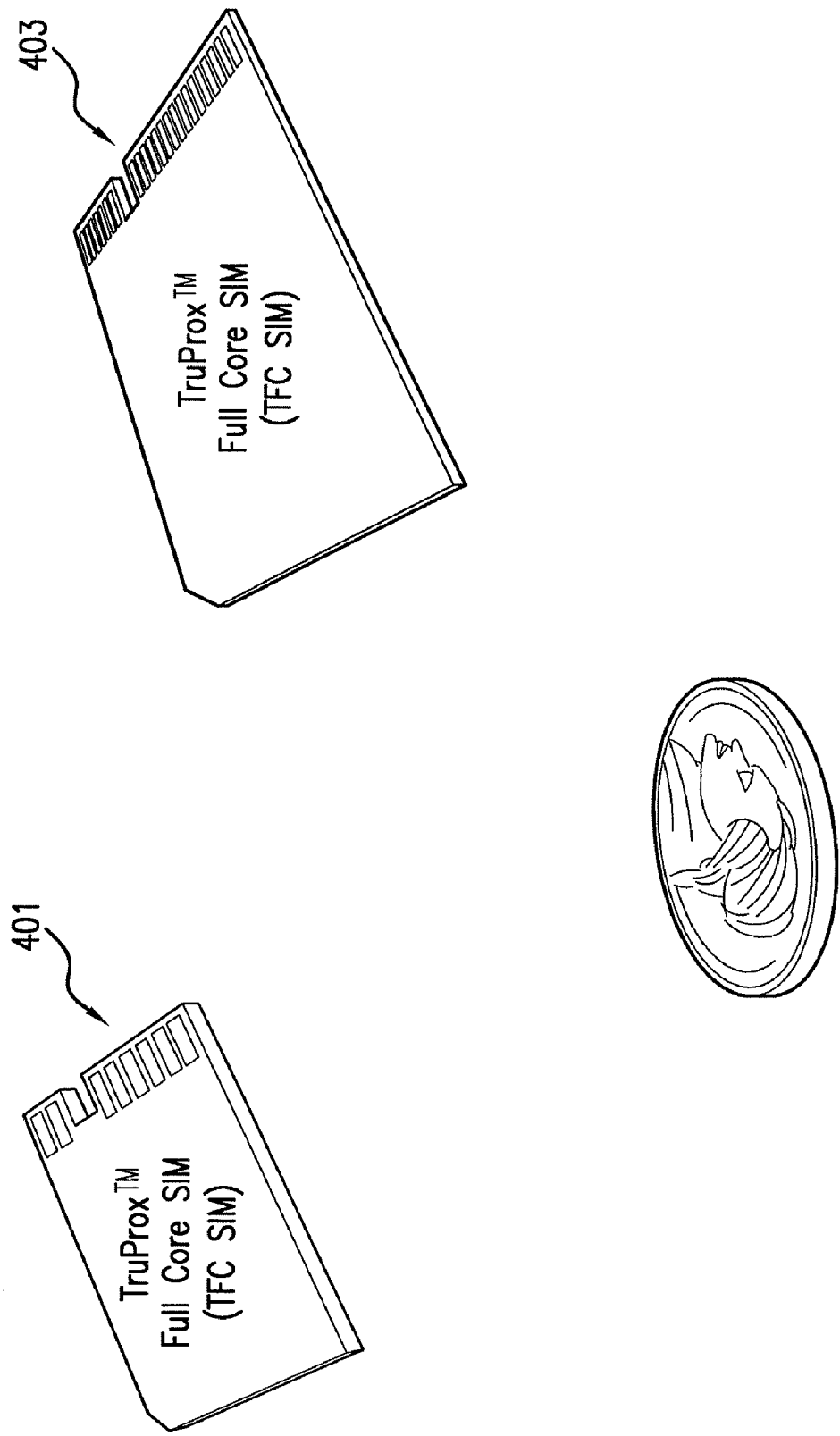
FIG. 4 illustrates the miniaturized PDKs and RDCs in accordance with one or more embodiments.

Referring to FIG. 4, example PDK 401 and RDC 403 are shown in accordance with one or more embodiments. As may be noted with the identified coin, the PDK and RDC devices may be implemented with miniaturized SIM cards, such as commercially available TruPox Partial-Core SIM cards, that may be incorporated within player cards, wireless handheld devices, cell phones, electronic gaming machines and their system components.

Referring to FIG. 5, PDK form factors 501, 502 and RDC form factors 503, 504 are shown in accordance with one or more embodiments. The proximity technology can be embedded into casino patron player card that can fit into the wallet as shown with PDK form factor 502 or in the form of a Key FOB such as 501. RDCs 503, 504 may be integrated into gaming machine components (such as a GMU or iVIEW) or can be separately powered and deployed throughout the casino. RDC 504 has the form of a PCMCIA card that may be inserted in an associated slot connecting to a processor. RDC 503 may have the form of a self-contained set top box including processor, memory, and network connection technology. Each of the RDCs may have an associated antenna attached.

Referring to FIG. 6, PDK and RDC form factors 601, 603 are shown in accordance with one or more embodiments which may be issued to an employee and casino patron in the form of FOBs. PDK form factor 601 provides labeled buttons which may be used to trigger different events. RDC form factor 603 may be provided to a patron and include an integrated biometric reader in this example a fingerprint reader to authenticate the identification of the bearer at an EGM in a similar manner as inserting a player card in a card reader. The biometric data is sampled and compared with the sample of the biometric data stored in the PDKs in proximity to this RDC. If good, the transactions are validated like AFT transactions for a gaming device. This RDC can be integrated into the Electronic gaming machine system components to enable proximity detection and biometric authorization at the gaming device.

Referring to FIG. 7, PDK 701 and RDC 703 are shown in accordance with one or more embodiments in communication with each other. Upon PDK 701 being identified as within range of RDC 703 through a wireless transmission from PDK 701 received by RDC 703, a verification and authentication procedure is initiated. For example, each device may verify that the other device is a TruProx device. If verification confirms that the devices are valid, then PDK 701 and RDC 703 may transmit and receive radio signals to determine authentication level and intended service. If the authentication step is successfully completed, then a secure wireless communication channel may be established and maintained until PDK 701 moves out of range of RDC 703. As part of the process, data stored within the PDK and/or events initiated at the PDK by button presses are transmitted to the RDC. This data, a time stamp, and RDC data may be transmitted by RDC 703 to the location tracking and/or real-time dispatch servers. Based on a request made through PDK 701, such as a request for a beverage, then a transmission request beverage transmission may be sent from the real-time dispatch server to a food and beverage station server and/or employee with a PDK device located within the proximity of PDK 701; whereupon, a beverage delivery may be provided to the patron with PDK 701 in a timely and efficient manner. As part of initiating and/or maintaining secure communications, encrypted/decrypted messaging may be utilized and radio frequencies may be randomly selected using random number techniques.

PDK 701 may communicate bi-directionally to server as a remote notification, alert, and messaging device. The memory may include biometric data such as the authorized person's photograph enabling an EGM to capture a facial image of the patron or employee and match the stored photograph data in PDK 701 to authenticate the identification of the patron and grant access to the patron's account. Additionally, account numbers may be stored on PDK 701, such as credit card numbers, to enable automated e-commerce transactions. Software and data within PDK 701 and RDC 703 may be dynamically updated through download and reconfiguration processes.

Levels of authentication may be utilized to grant access to selected service levels. For example, depending upon a player's level, the player account may be designated at a silver, gold or platinum level. Various services may be associated with those levels. As part of the authentication, the player account may be accessed to determine the player service level or the information may be stored on the PDK device of the patron. Similarly, various employees may have varying levels of service that they are authorized to provide to patrons and the PDK device of the respective employee may store the authorization level. Thereby, when a request is made through PDK 701, the nearest employee PDK authorized to provide the level of service may be located through the location server.

Referring to FIGS. 8A-8D, display screenshots 1301 are shown which may be generated from a control station, such as a commercially available Bally control station, connected to networked gaming system 101, wherein location tracking and real-time dispatch servers and their respective databases are accessed to present an image representation of a casino floor with data superimposed relating to the PDKs and RDCs. To generate the display screenshots, the control station comprising a processor and memory, such as a conventional personal computer with a display and keyboard, includes an executable location tracking software module which may be generated to generate the described screenshots by accessing the PDK and RDC data from the location tracking server and/or real-time dispatch server. Alternatively, the location tracking and/or real-time dispatch server may include executable programming to process the received raw data from the RDCs and a connected user station may access the respective servers and include display software to display the respective screenshots and corresponding data described herein.

Figure 8A:
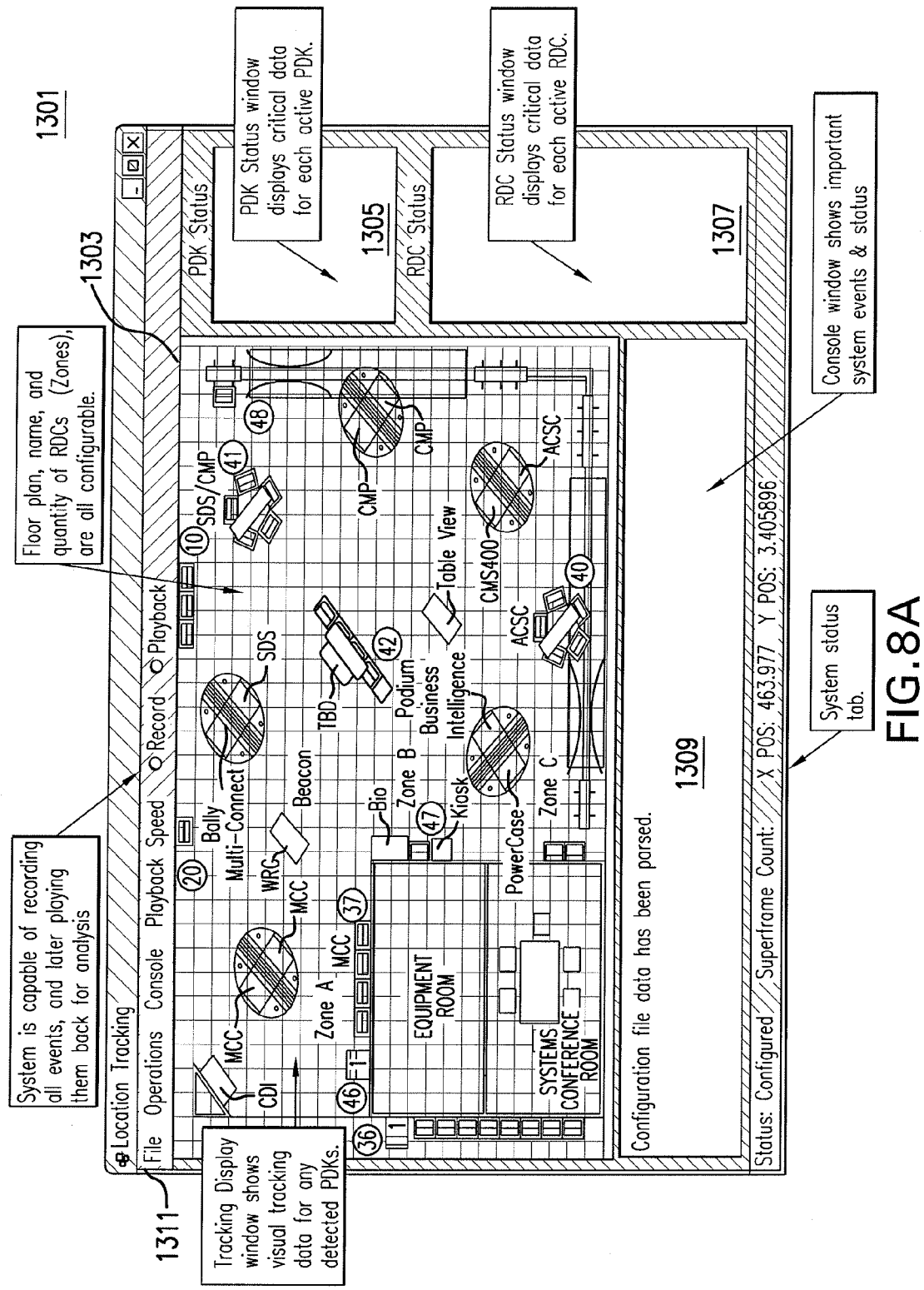
FIG. 8A illustrates a screenshot of the Location Tracking application for a casino floor as may be implemented on casino control +station connected to a networked gaming system in accordance with one or more embodiments.

Referring to FIG. 8A, example screenshot 1301 of casino floor 1303 is shown which may include real-time tracking of PDK and RDC devices superimposed in accordance with one or more embodiments. The detection zones of respective overhead or floor RDCs are shown as Zone A, Zone B, etc. The numbered RDCs and their respective locations with respect to various gaming devices are shown by numbered circles where the displayed number may correspond to a RDC identifier number transmitted with PDK data. Employee PDK devices may be distinguishable from patron PDK devices such as by color coding and/or different numbering. Patron PDK devices may be color coded as well to distinguish player levels. The locations of several zone RDCs are identified by a WRG box labeled 'Beacon'. In addition to gaming sections, the display may show areas associated with an equipment room, systems conference room, and backroom equipment, such as Bally MCC, Bally Multi-Connect SDS, Bally Business Intelligence PowerCase, Bally ACSC, Bally SDS/CMP, etc.

PDKs that enter the detection zone of the specific RDCs may be shown in the screenshot according to their detected locations. This software tool provides a user interface to manually layout the casino property or to import electronic CAD renderings of the floor plans. The RDC antennas may typically be located in the ceiling above the floor but may also be incorporated within each gaming machine, associated with a bank of gaming machines, or embedded in or under the carpet or floor. The respective RDCs may cover whole sections of the gaming floor or be tightly focused into a very small square foot zone. In addition to the real-time view of the PDK location tracking, the casino can record all activity of PDKs as they move throughout the floor and provide a visual playback at a later time. The speed of the playback can be configured to provide very slow to very fast playback to see the density map of players with PDKs as they move throughout time. Alternatively an individual or selected group of PDKs or Patron ID's may be filtered and tracked versus all of the devices and patrons. The playback may be time stamped.

The employee and/or patron PDK devices may have buttons to signal new events, advance or close events. By example, a patron may initiate a drink request by selecting a drink on the player tracking display or on the gaming machine display device. Alternatively, the patron may automatically be dispatched a beverage after a certain amount of time at a gaming device or other casino venue. In another embodiment, the patron may have a PDK and press a button to initiate a drink or service request. The drink dispatch system will initiate a transaction for this request. The time is logged to keep track of response time for each stage of the transaction. The bar makes the beverages. The host/hostess delivers the drink to the location where the original request was initiated. The hostess presses the button on the PDK to close the beverage transaction. This time is logged in the server. The proof that the host/hostess actually delivered the drink is done by monitoring the PDK location of this beverage host. The host can be monitored and evaluated for delivery time per transaction. Through the user interface, an operator may monitor events and status which may be displayed in respective windows, such as PDK status window 1305, RDC status window 1307, and Console window 1309. By use of the proximity sensing data transmitted from the casino floor network, the real-time dispatch server may identify employee locations, manage employees, and more optimally or efficiently position employees and assets. Through the user interface, an operator may evaluate the performance of employees and the delivery of services to patrons. Additionally, the user interface may initiate management alerts when under and over staffed conditions are identified, identify unauthorized breaks, and provide round times in order to determine and manage efficiency and profits. Through the user interface, an operator may manage customer experiences in real-time to return players back to action faster; maximize financial return by deploying resources automatically; optimize employee accountability and utilization; integrate and automate management role into casino operations; personalize the player experience and build loyalty; control in real-time every aspect of the customer experience; and obtain a direct increase in corporate value and EBITDA.

Through the user interface, an operator may easily determine how much time is spent on the casino floor and by whom, what events are being responded to, what comps are being issued and why. For example, the user interface may track the slot department including the Shift Manager and Supervisors, Slot Hosts, and associated Alert Responses. Through the user interface, an operator may alert attendants and supervisors about personnel who are in excess or are needed at various places on the floor. Staffing and services may thereby be reallocated in real-time by getting information directly to the person who requires it the most.

Thousands of customer service interactions occur every day in every casino property. Each interaction represents an opportunity to; deliver a superior customer experience, drive customer satisfaction, increase player loyalty, and improve the business. Slot service, food and beverage service, and table game management provide a majority of an operator's gaming floor "moments of truth" where your employees interact directly with a customer. The improvement of efficiency by properly adding proximity technology into the beverage service enables the casino to reduce mid-level managers by being able to more effectively and automatically re-assign and deploy cocktail hosts and staffing according to real-time needs.

Display screenshot also includes pull-down menu 1311. Pull-down menu includes a File tab, Operations tab, Console tab, Playback Speed tab, a Record button, and Playback button. The File tab may be selected to open saved files and to save the current data and configurations to specific files for later use by the location tracking software module or other data analysis or visualization tools. The Operations tab may be selected to start displaying location tracking, pause the tracking and stop the tracking. The PDK data feed coming in from the RDCs is continuously stored in a database. The Operations tab feature allows the visual monitoring of the playback to be started, paused, stopped and resumed. The Console tab may be selected to choose selected events to be displayed on the screen. The viewing/logging filters that may be utilized include any casino pre-defined field not limited to: Player club level, patron ID, PDK ID, group of patrons, group of PDKs, group of RDCs, patrons who spend more or less than one or more preset thresholds for a visit or series of visits, patrons who wager more or less than a preset threshold for a visit, patrons who lose more or less than a certain preset threshold per time period or session or number of sessions, active wagers, people requesting service at this time, employee ID's, zones of the property, table game players and PDKs, and/or people who won more or less than preset thresholds per session or time period. The Playback Speed tab may be selected to set the playback speed of the recorded PDK locations. A time stamp and time line may be shown at the bottom of the screen.

Figure 8B:
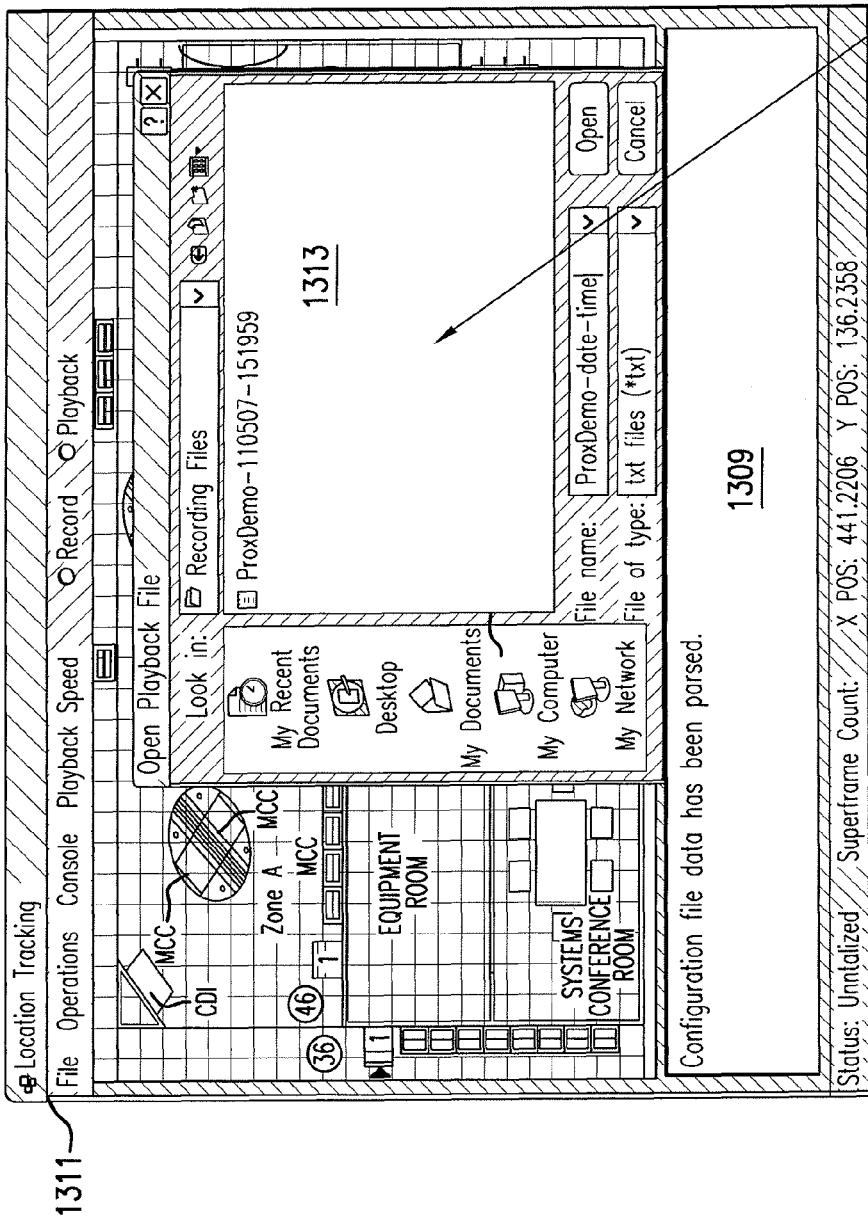
FIG. 8B illustrates a screenshot with an Open Playback File pop-up window for a casino floor as may be implemented on casino control station connected to a networked gaming system in accordance with one or more embodiments.

Referring to FIG. 8B, display screenshot 1301 is shown with Open Playback File pop-up window 1313 in accordance with one or more embodiments. Open Playback File pop-up menu may display when the Playback button is selected, so that an operator may view individually recorded locations tracking files each with their own filters applied.

Figure 8C:
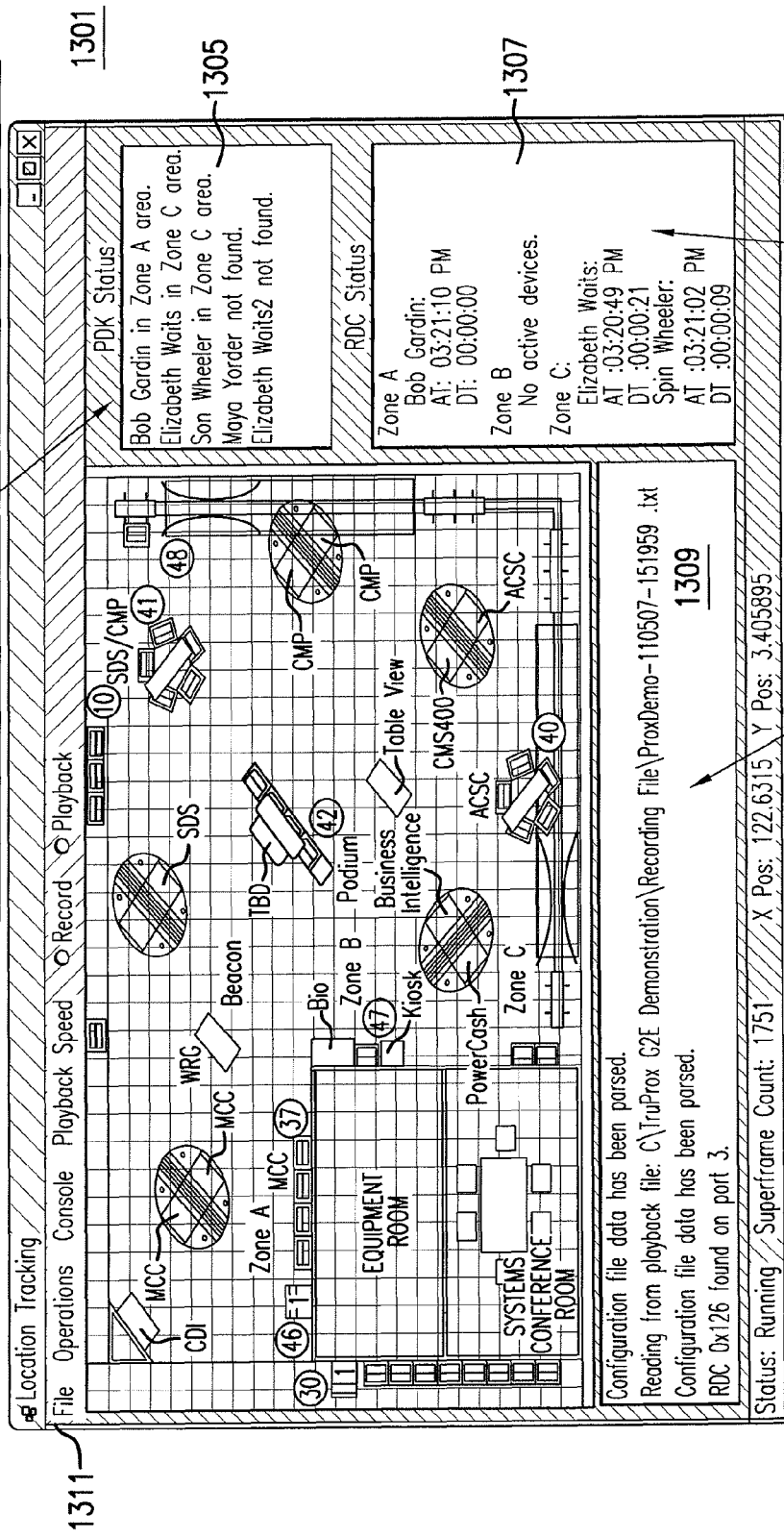
FIG. 8C illustrates a screenshot in Playback mode for a casino floor as may be implemented on casino control station connected to a networked gaming system in accordance with one or more embodiments.

Referring to FIG. 8C, display screenshot 1301 is shown in Playback mode in accordance with one or more embodiments. PDK status window 1305 displays the specific Patron PDKs and the zone where the patron is located. Each of the recitations may be color coded to indicate the club status of the patron. For example, Patron Bob Gardin may be referenced both by red text and a red icon on the floor map, Patron Elizabeth Waits may be referenced by green text and a green icon on the floor map, and Patron Spin Wheeler may be referenced by blue text and a blue icon; wherein, each of the colors correspond to a player's playing history level which may be calculated based upon average bets, average amounts bet during playing sessions, repeat visits, and so forth. RDC status window 1307 displays a single patron/PDK in Zone A, no person/PDK in Zone B, and two patrons/PDKs in Zone C. Every arrival and departure time of each PDK/Patron is displayed and recorded. In addition to the recitation in the PDK and RDC status windows 1305, 1307, a color coded circle may be located near the associated zones on the floor map. Filters may also be applied to this window. Console window 1309 displays the general system event and status data. As a patron moves from one zone to another zone, the floor map will track the movement. For example, the RED patron icon may be displayed to move from Zone A to B and the BLUE patron icon may be displayed to move from Zone C to A.

Figure 8D:
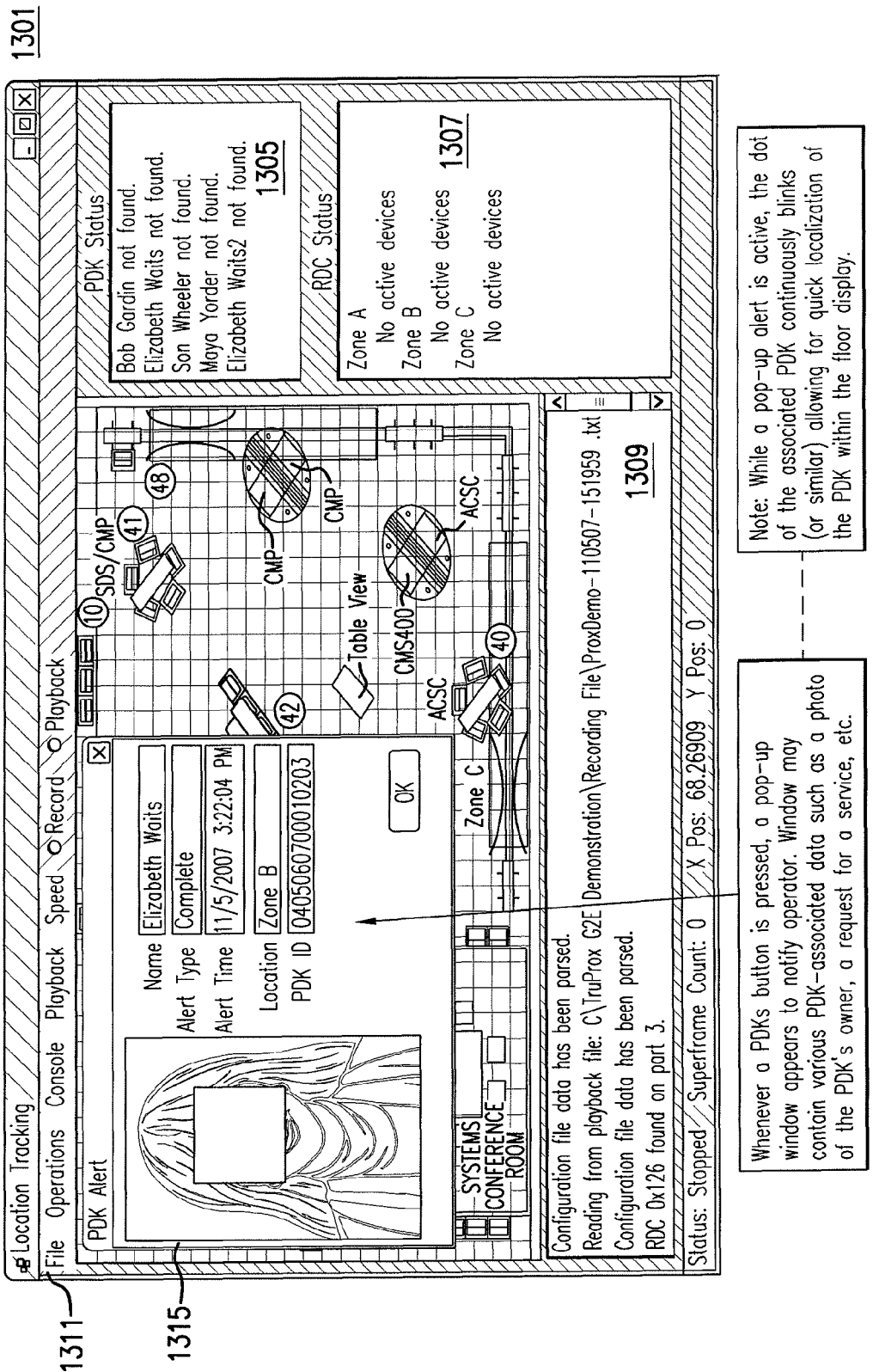
FIG. 8D illustrates a screenshot with an Alert pop-up window for a casino floor as may be implemented on casino control station connected to a networked gaming system in accordance with one or more embodiments.

Referring to FIG. 8D, display screenshot 1301 is shown with PDK Alert pop-up window 1315 in accordance with one or more embodiments. Using the interface, an operator may view specific patron ID information from the player tracking database, the biometric database, the PDK registry database, and what current events have been triggered by a specific patron by pressing a button on his/her PDK. The associated icon on the displayed floor map may blink until the service request is met. When a specific type of event occurs such as a beverage request, the data is shown to the casino host/hostess. The requested, preferred favorite drink, or list of favorite drinks is shown to the casino personnel. They can then dispatch out the beverage request at this time. The casino staff knows where the patron is at all times and can deliver the drink to that player whether or not the patron is actively playing on the floor at this time. The player club level or rating is shown to enable the casino to see how valuable this patron is and can step up/down the response time to this specific patron based upon their value to the casino. This allows the best response time to the most valuable patrons. The beverage host/hostess would have a wireless device that would enable them to real-time track the location of the patron/PDK so the drink can be delivered to a location different from where the request originated.

Multiple events triggered by patrons or employees can be shown and tracked simultaneously on the same user interface. Different departments in the casino like food and beverage or hand pay dispatch may have their own location tracking application that lets them see the patrons/PDKs or events that correlate to their business or skilled function. An example of a food and beverage station and manager station are shown in FIG. 1C.

Referring to FIG. 9, a table of the features of the real-time dispatch system that may be integrated into the proximity location tracking system in accordance with one or more embodiments. The applications include RTSS (real-time slot service), RTFNB (real-time food and beverage), RTVP (real-time valet parking), RTPH (real-time player host), RTCM (real-time customer marketing), RTCS (real-time customer service), RTKM (real-time knowledge management).

Figure 10:
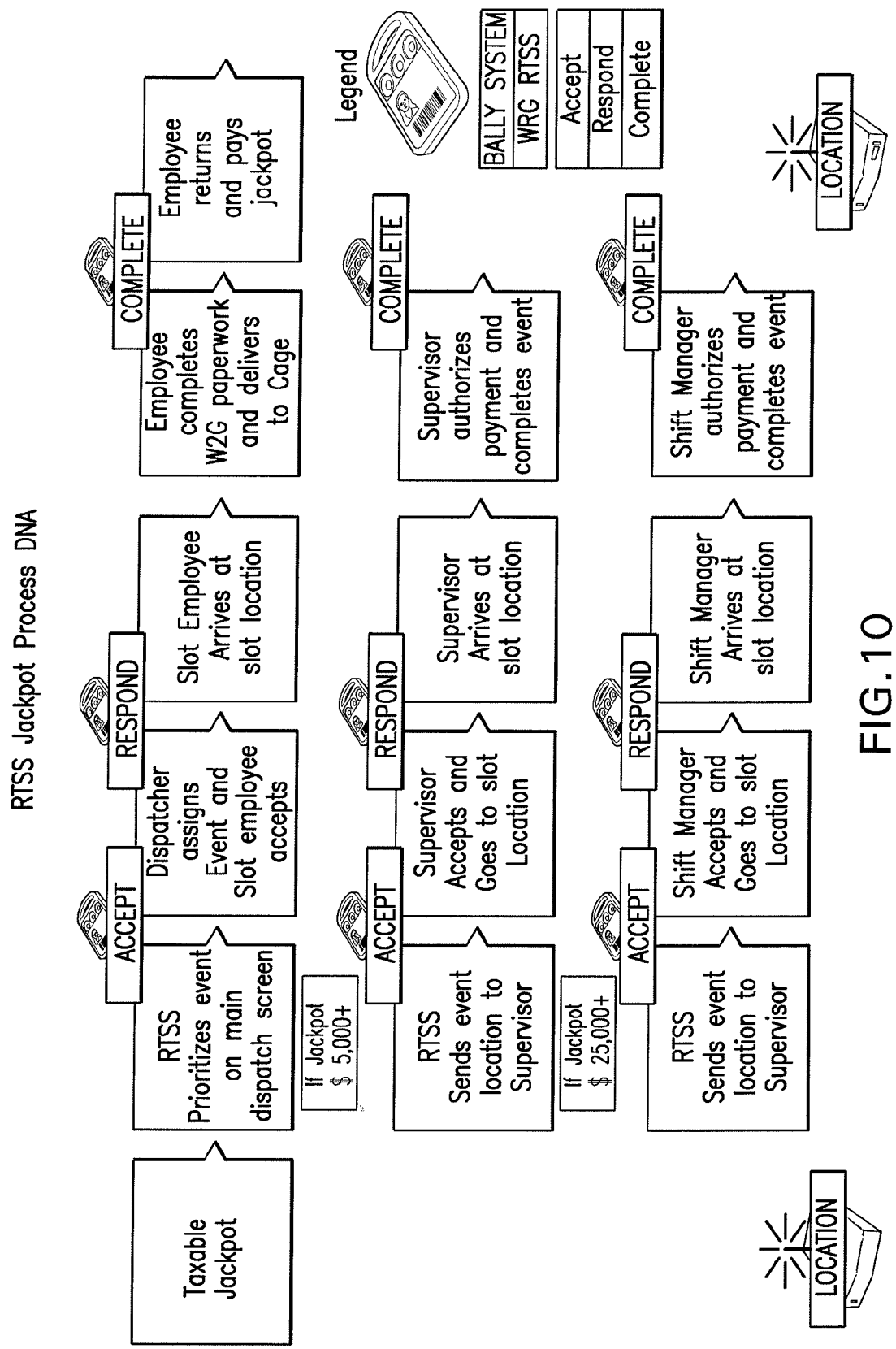
FIG. 10 illustrates the RTSS Jackpot process when a jackpot occurs on the slot floor in accordance with one or more embodiments.

Referring to FIG. 10, a flow diagram is shown of an example Jackpot process when a jackpot occurs on the slot floor. This process has integrated the proximity location tracking PDKs and button presses from employees at various phases of the process. By knowing the exact location and jackpot size, the proper skill level and/or authorization level employee can be identified and directed to the patron for payment. Payment would not be made by an employee who was not in proximity to the winning patron and did not have the right approval level. The proximity system allows for the dispatch of the proper employee to the particular jackpot pay.

Figure 11:
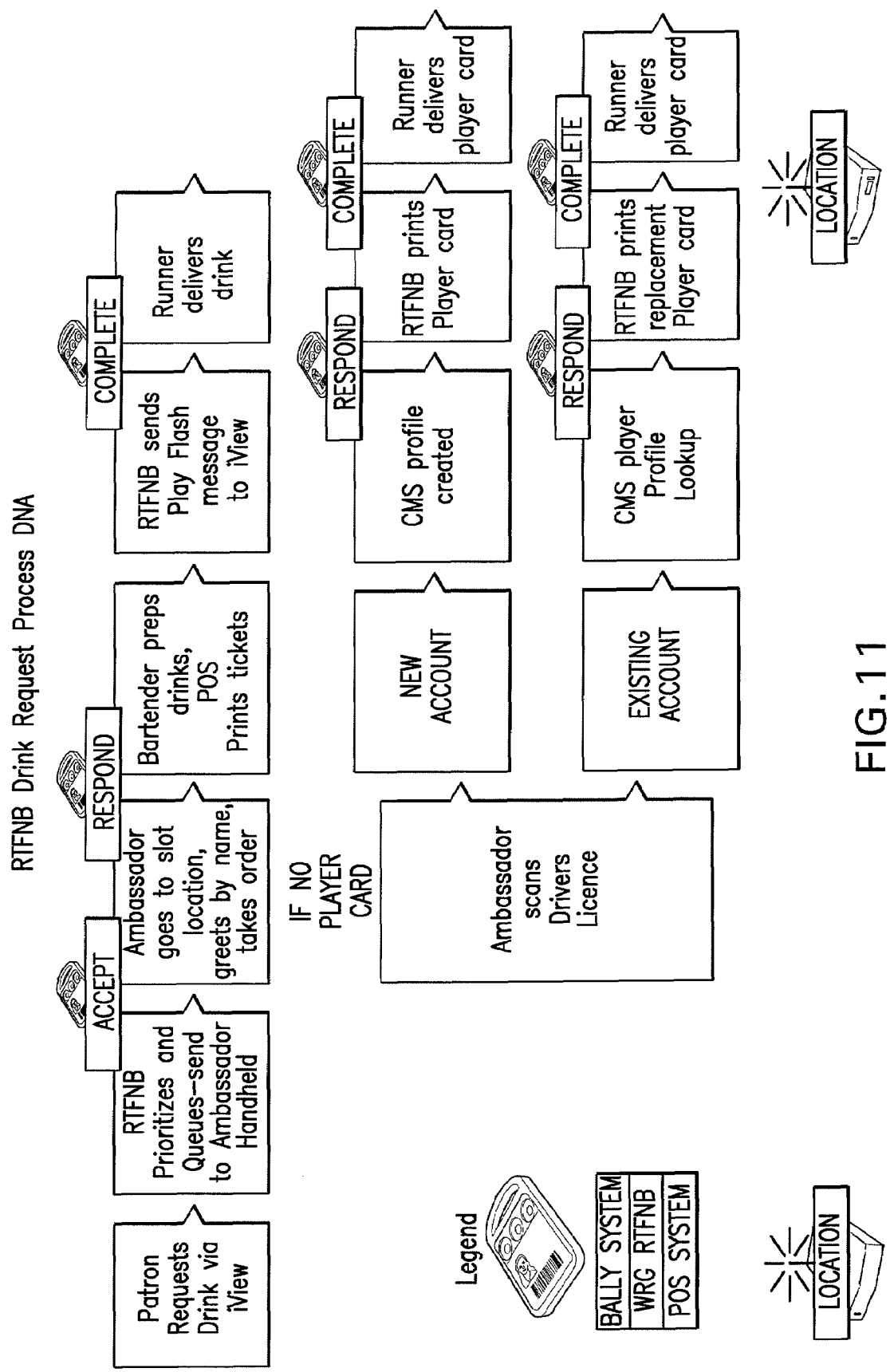
FIG. 11 illustrates an RTFNB drink request process in accordance with one or more embodiments.

Referring to FIG. 11, a flow diagram is shown of an example drink request process. The proximity system passively monitors and reports employee location to handle the drink request.

Figure 12:
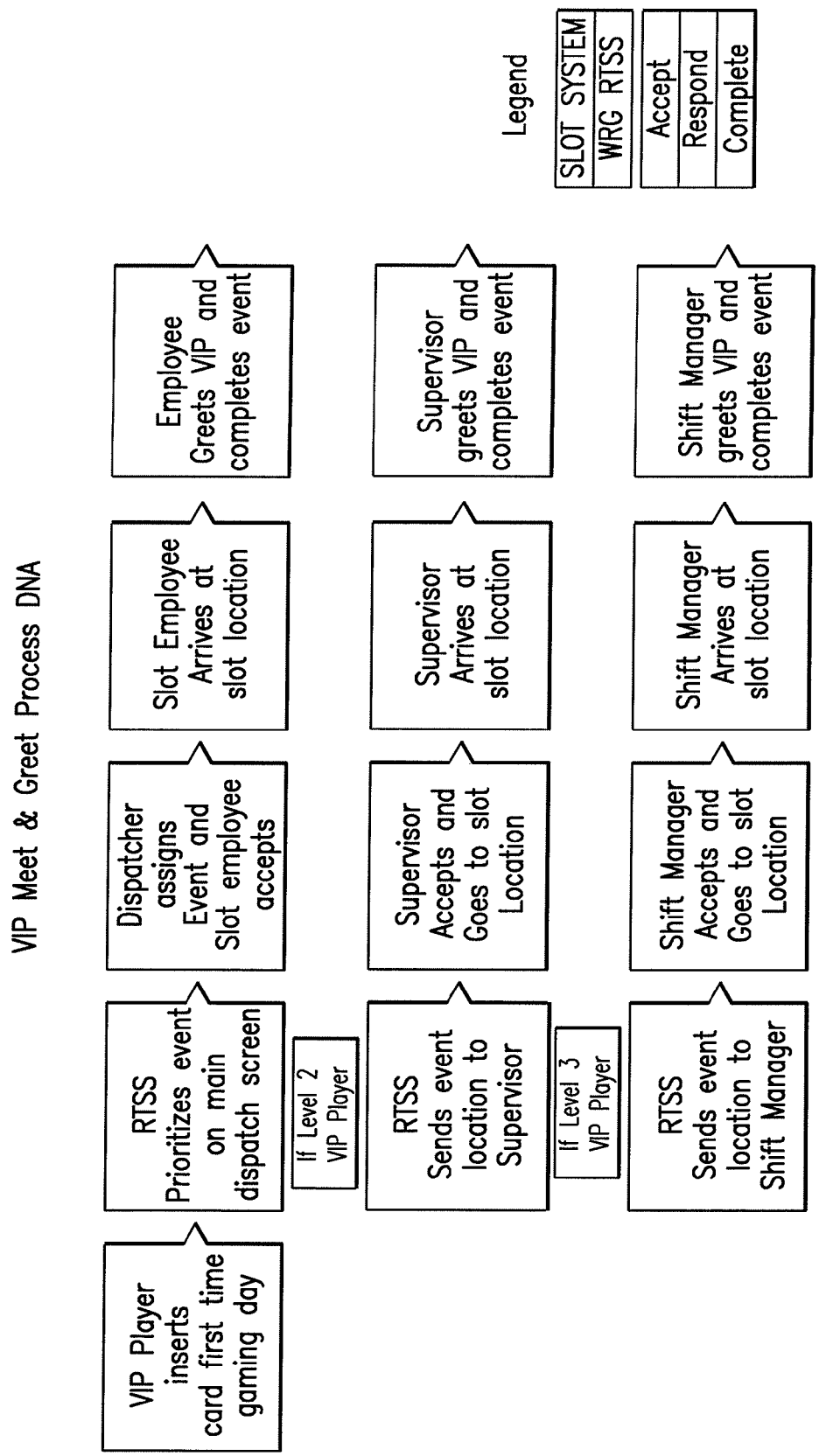
FIG. 12 illustrates a VIP Meet and Great Process in accordance with one or more embodiments.

Referring to FIG. 12, a flow diagram is shown of an example VIP Meet and Greet Process. This is the normal process of greeting a valued customer when they put their player card into a gaming machine. With proximity detection added to the process the patron merely needs to be tracked by any RDC as they come on the casino property and then the meet and greet casino personnel can be directed to greet the patron. Casinos will also track the patrons that are leaving the property. At any one time, they can see how many people are on the property and can dispatch or call in extra staff to handle the load or can send some staff home or on break based upon this data. Casino staff may also be informed of how many of each type of patron are on the premises at any given time.

Figure 13:
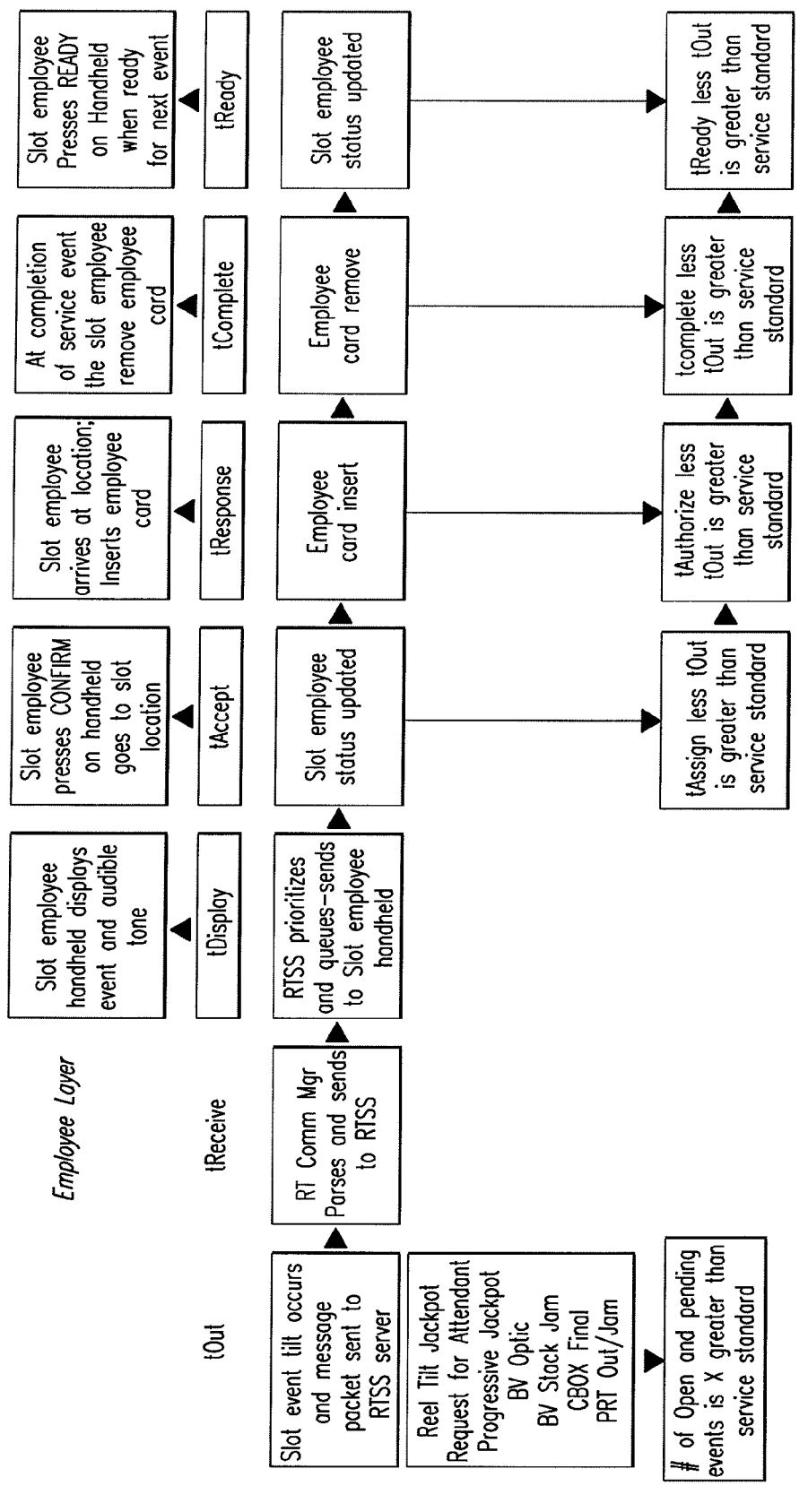
FIG. 13 illustrates a Real-time Slot Service's managed rules based process without location tracking in accordance with one or more embodiments.

Referring to FIG. 13, a flow diagram is shown of an example Real-time Slot Service's managed rules based process without location tracking.

Figure 14:
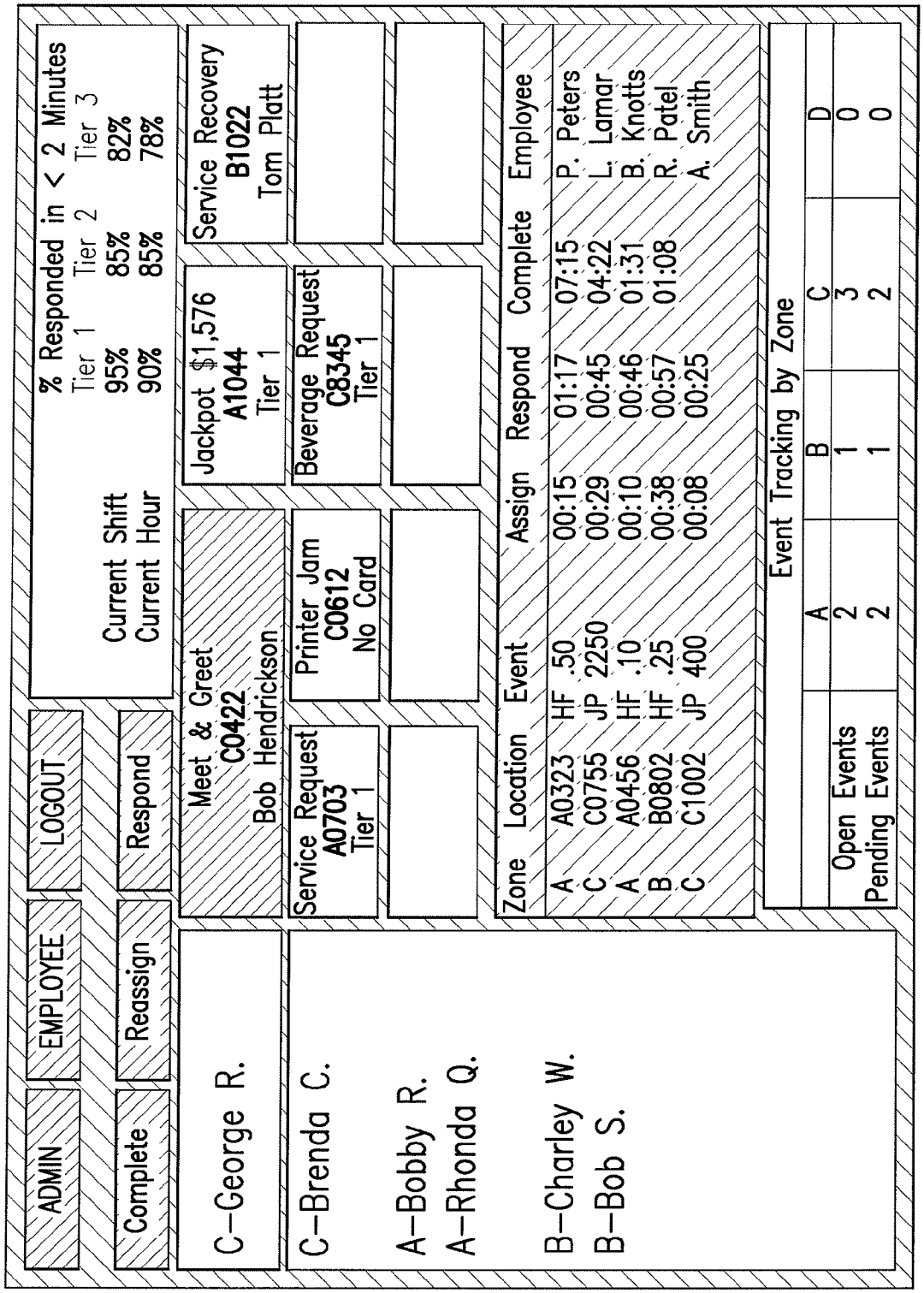
FIG. 14 illustrates a WRG employee dispatch service application in accordance with one or more embodiments.

Referring to FIG. 14, a display screenshot of an example employee dispatch service application is shown which may be implemented through the real-time dispatch server 133, as shown in FIG. 1A and displayed on the control station and/or other service-related stations, as shown in FIG. 1C, in accordance with one or more embodiments. Available staff are shown, triggered events are shown, number of events per zone. The current employee assigned to a particular event is shown. The casino staff can see incoming events and assign particular staff to these events using the right skill level employee.

Referring to FIG. 15, a display screenshot of an example employee dispatch service application is shown which may be implemented through the real-time dispatch server 133, as shown in FIG. 1A and displayed on the control station and/or other service-related stations, as shown in FIG. 1C, in accordance with one or more embodiments. Detailed zone data may be shown including the VIP customers in that zone, the number of carded players, uncarded players, slot attendants, beverage servers, ratios of VIP's to attendants, ratios of VIP's to beverage servers, ratio of players to slot attendants, ratio of players to beverage servers, open beverage events, open slot events, VIP beverage service target ratio, VIP slot service target ratio. This data may enable the casino staff to reallocate the staff to other zones on property as the patrons move around.

Figure 16:
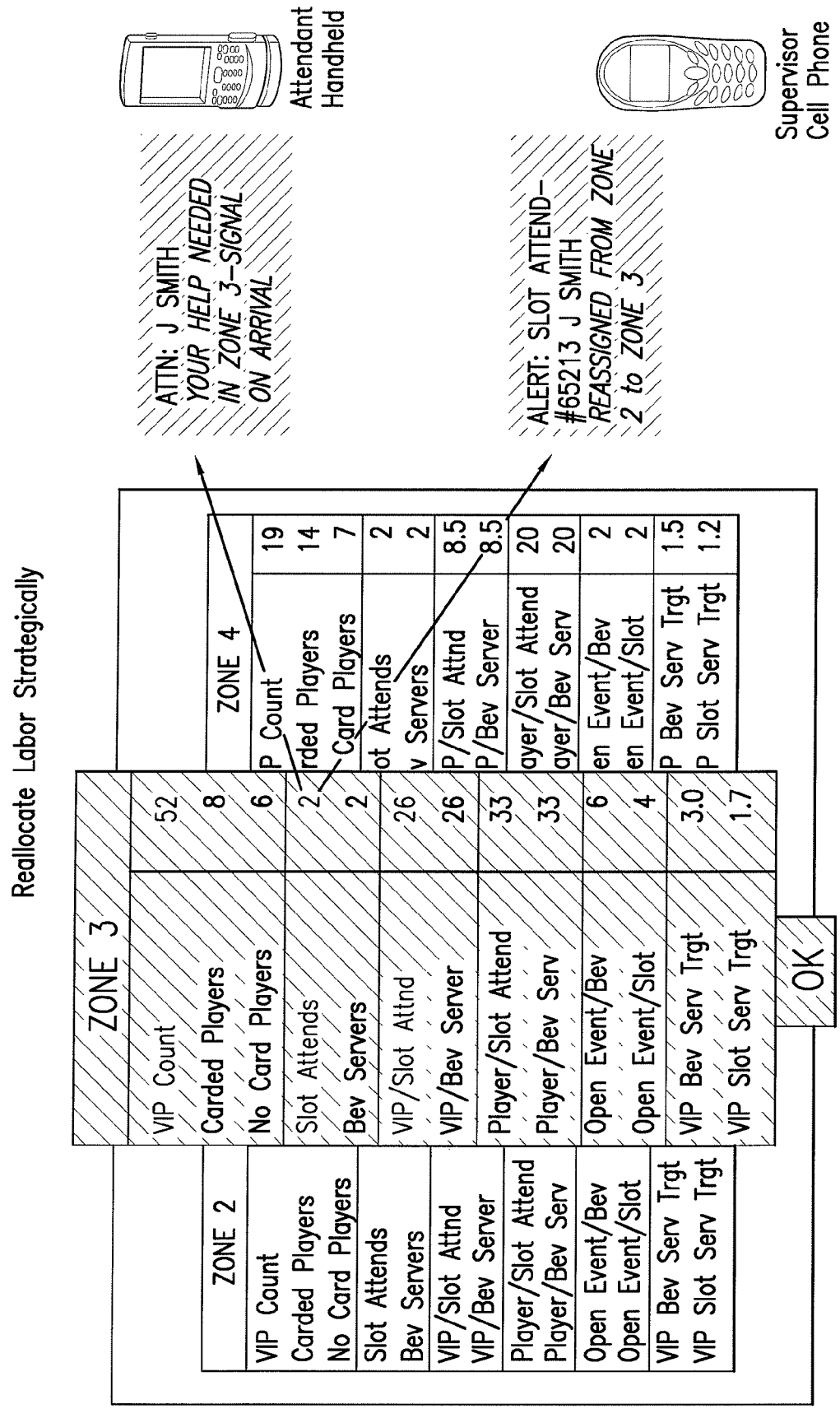
FIG. 16 illustrates a WRG employee dispatch service application in accordance with one or more embodiments.

Referring to FIG. 16, a display screenshot of an example employee dispatch service application is shown which may be implemented through the real-time dispatch server 133, as shown in FIG. 1A and displayed on the control station and/or other service-related stations, as shown in FIG. 1C, in accordance with one or more embodiments. Detailed zone data may be shown. Using the data, authorized attendants may be directed to the event or new zones by using attendant handhelds or cellular phones.

Referring to FIG. 17, a display screenshot of an example employee dispatch service application displaying service recovery alerts and management alerts is shown which may be implemented through the real-time dispatch server shown in FIG. 1A and displayed on the control station and/or other service-related stations, as shown in FIG. 1C, in accordance with one or more embodiments.

Figure 18:
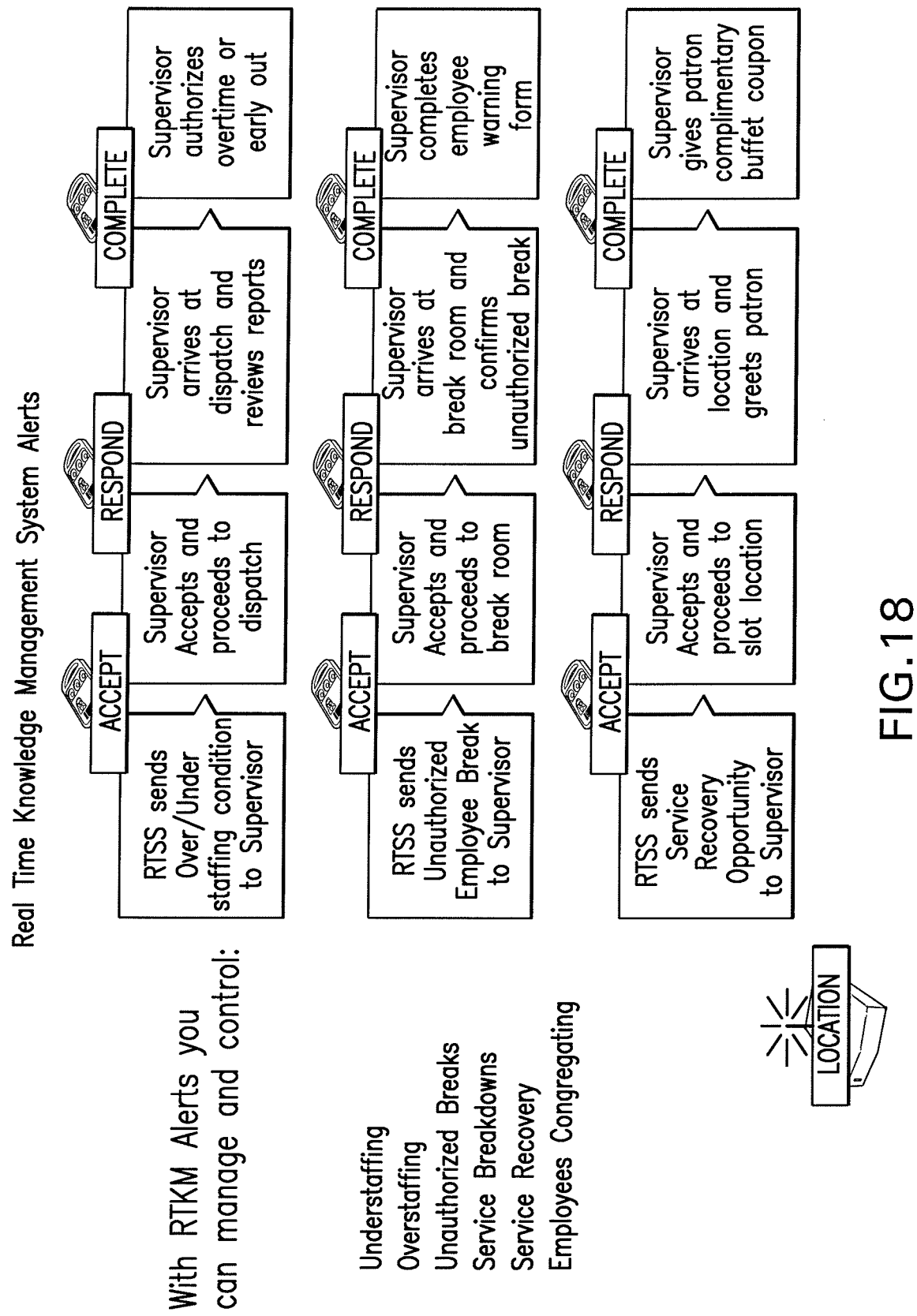
FIG. 18 illustrates a Real-time knowledge management system alerts integrated with employee assigned PDKs in accordance with one or more embodiments.

Referring to FIG. 18, a flow graph diagram of an example of real-time knowledge management system alerts integrated with employee assigned PDKs is shown which may be implemented through the real-time dispatch server shown in FIG. 1A and displayed on the control station and/or other service-related stations, as shown in FIG. 1C, in accordance with one or more embodiments. Various stages of the transaction process are advanced by employee button presses on his/her PDK. The dispatch system can close or advance a specific transaction state when they know for sure the employee is at the right location in proximity to the event and the right button has been pressed on the PDK.

Figure 19:
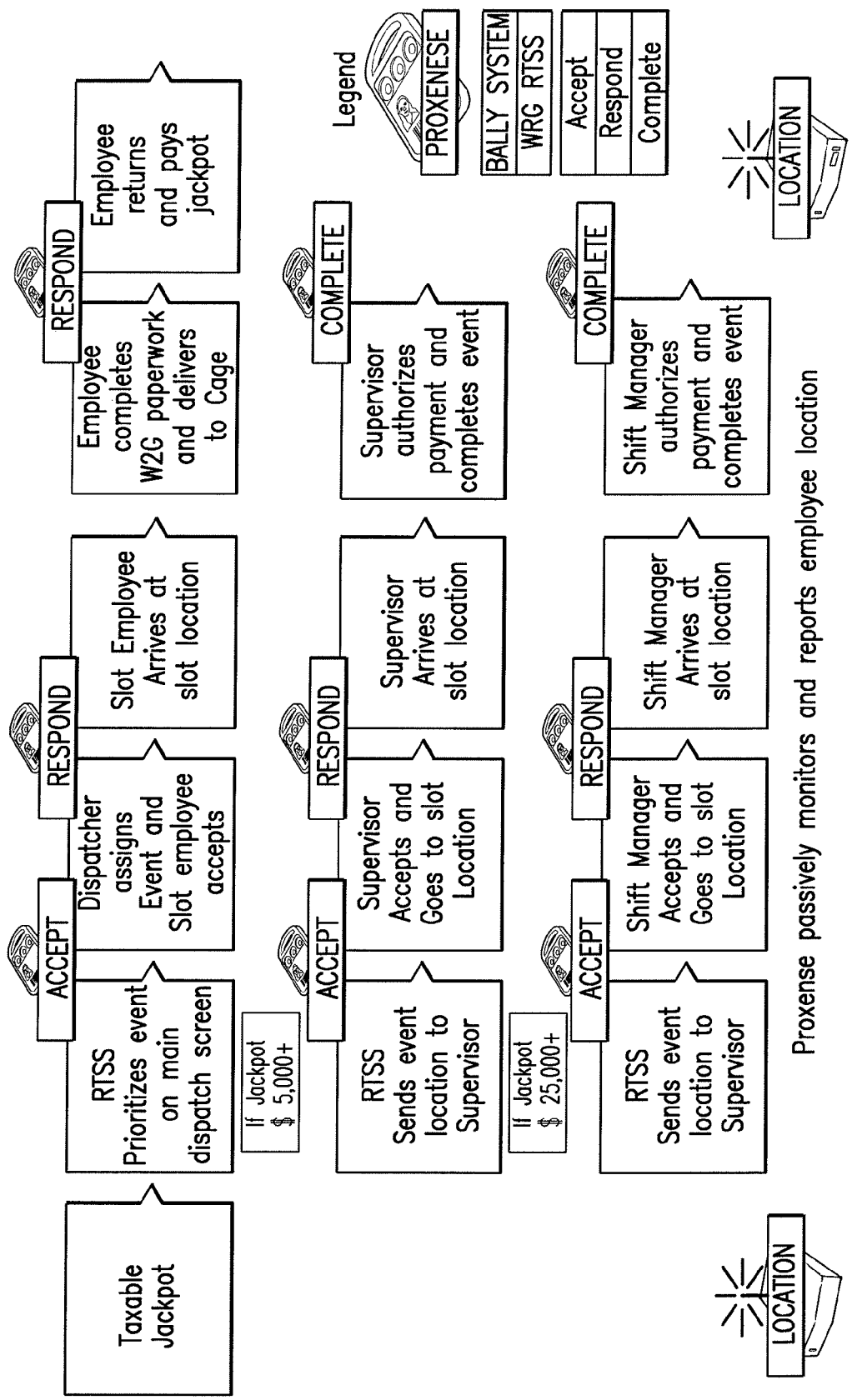
FIG. 19 illustrates an RT Slot System Jackpot event improved with the uses of the wireless PDK location tracking system in accordance with one or more embodiments.

Referring to FIG. 19, a flow graph diagram of an example real-time Slot System Jackpot event improved with the uses of the wireless PDK location tracking system. Various stages of the transaction process may be advanced by employee button presses on his/her PDK.

Figure 20:
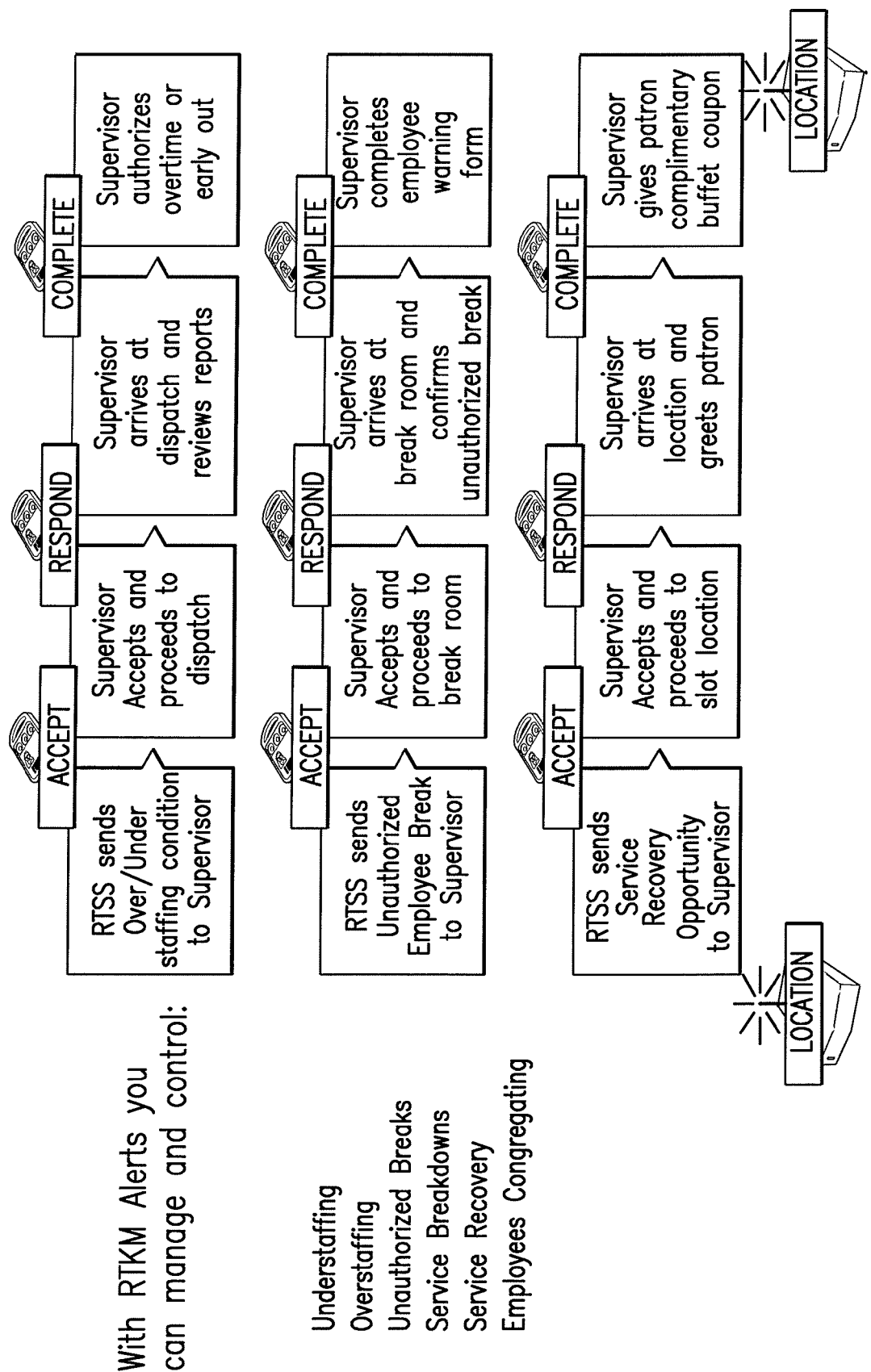
FIG. 20 illustrates a process showing the improved Real-time knowledge management system integrated with location based PDK associated with specific employees in accordance with one or more embodiments.

Referring to FIG. 20, a flow graph diagram of an example improved real-time knowledge management system integrated with location based PDK associated with specific employees is shown which may be implemented through the real-time dispatch server shown in FIG. 1A and displayed on the control station and/or other service-related stations, as shown in FIG. 1C, in accordance with one or more embodiments. Automated systems may track that the right employee showed up at the right location to advance the transaction to the next level with or without a button press by the employee on his/her PDK.

Figure 21:
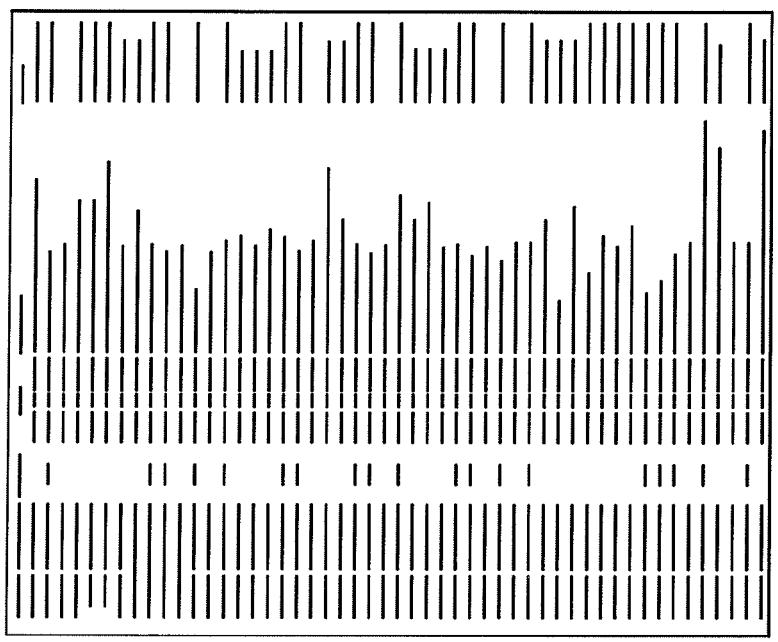
FIG. 21 illustrates a transaction display for a specific employee that does a specific role or function in accordance with one or more embodiments.

Referring to FIG. 21, an example transaction display for a specific employee that does a specific role or function is shown which may be implemented through the location tracking and real-time dispatch servers shown in FIG. 1A and displayed on the control station and/or other service-related stations, as shown in FIG. 1C, in accordance with one or more embodiments. The time, description of the event, and location data may be tracked for these employees. By example, FIG. 21 shows a slot shift manager's transactions and locations of those transactions.

Figure 22:
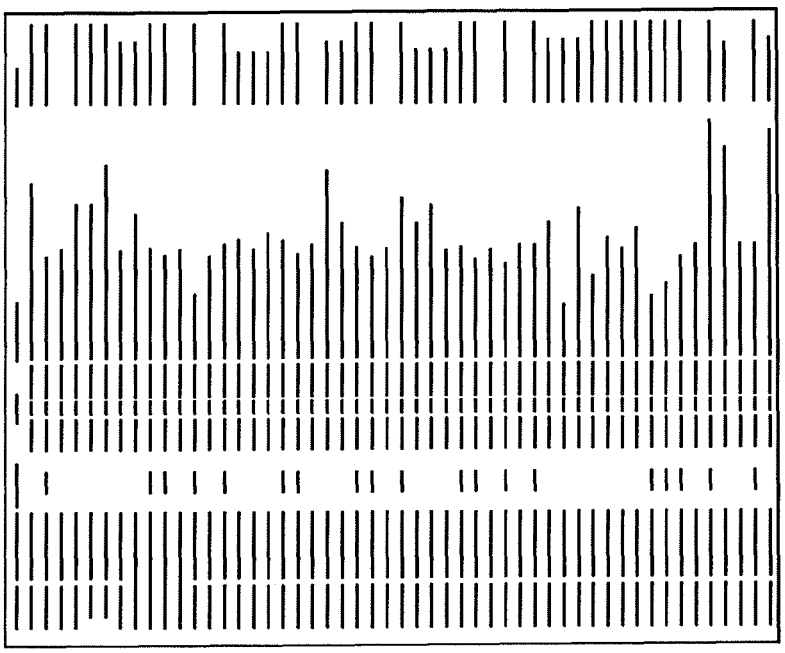
FIG. 22 illustrates a transaction display for a specific employee that does the Beverage Service Role or function in accordance with one or more embodiments.

Referring to FIG. 22, an example transaction display for a specific employee that does the Beverage Server role or function is shown which may be implemented through the real-time dispatch server shown in FIG. 1A and displayed on the control station and/or other service-related stations, as shown in FIG. 1C, in accordance with one or more embodiments. The time, description of the event, and the employee location data is tracked for this employee.

Referring to FIG. 23, an example transaction display for a specific casino VIP patron is shown which may be implemented through the real-time dispatch server shown in FIG. 1A and displayed on the control station and/or other service-related stations, as shown in FIG. 1C, in accordance with one or more embodiments. The patron's name, tier level, rating level, theoretical win and/or wagers, last visit date, time, location and description of events are shown. With this data the casino may track everything the VIP player did and how long and where the event occurred. This data may be used to learn behavioral patterns for this patron and how well customer service was dispatched to the patron.

An example usage of the location/dispatch system within the gaming network may be to track asset locations and occurrences on the casino floor and throughout the property which may be implemented through the real-time dispatch server shown in FIG. 1A and displayed on the control station and/or other service-related stations, as shown in FIG. 1C, in accordance with one or more embodiments. Certain types of PDK may be highlighted in different colors to quickly identify visually their location. For example control keys for the electronic game machines or other keys for the casino property can be shown. The location of the slot host wallet may be shown. The locations of cash carts may be show. Cashbox locations may be shown. Security guard locations may be shown to determine if they are in proximity to specific physical assets like cash carts, control keys, cashboxes. Wireless gaming devices may be asset tracked by having a PDK embedded into the device. Gaming may be disabled if the device enters or leaves a specific area using this proximity tracking technology.

Another example of usage may be used to track customers and employees in real-time is shown which may be implemented through the real-time dispatch server shown in FIG. 1A and displayed on the control station and/or other service-related stations, such as shown in FIG. 1C, in accordance with one or more embodiments. Examples, include but are not limited to, different levels of patrons may be highlighted in specific colors; specific players that are not playing may be identified in other colors; and service ambassadors may be identified in different colors. Different zones may be shown. Filters may be included to let the person using this administration tool at the control station see everything happening on the whole floor or drill down to specific sections of the floor or specific employees or patrons and get more data about them or the events triggered for them. A complete mapping ability to map employee type or skill level with a certain color or symbol may be included. A complete mapping ability to map casino patron type with a certain color or symbol is included. Patrons who have met preconfigured thresholds of spending, amount wagered, amount won, amount loss are able to be highlighted and are given their own color. This may aid the casino staff in locating the employees or patrons that need to be interfaced with.

Another application of the integration of PDKs with the beverage host/hostess is the ability to optimize floor walking patterns to get the best efficiency for the employee. An antenna and RDC could be positioned at each corner of a bank of EGMs. When the hostess walks through each bank her location may be tracked. Reports can be provided to the casino staff and the employee to show their actual walking pattern to look for better efficient routes and to ensure the employee covers enough of the floor and not just say they were doing it. Employee evaluations may use this data.

Another example of usage may be for security guards. Their walking patterns may be analyzed to ensure proper coverage of the casino floor. Advice and evaluations can be given to correct or improve wrong patterns.

Another example of usage may be for a patron to automatically check out of his/her hotel room upon exit from the casino premises as identified by the proximity locating servers.

Each department in a casino (e.g., security, slots, food beverage) may use different definitions of zone mapping. The employee location tracking system may have a database that maps these zones to RDCs to the specific employees. This system can then render these different zones and their associate department employees on a visual interface. Employees can be notified by a beep or vibration or a LED on their PDK that they are not in their zone. This can be an aid to ensure that the employee is covering the right section of the floor. This is especially important as the zones dynamically change as the density of the patrons and their transactions change.

Another example of usage may be tracking the cashbox drop team as they do their job. This allows casino staff to see which machines have been done and confirm that the proper employees are in close enough proximity to the drop team or cash cart. For example, is there actually a security guard next to the cart at all times. These types of associations of employee PDKs to asset tags may be determined by the system and displayed at the control station. When a PDK leaves the area required for him/her to be, then alerts can be sent to management for corrective actions.

Another example of usage may be tracking the master keys PDK and the employee PDK who is carrying the master key which can be matched and their location be tracked together. So if a certain employee leaves the building with the master keys the casino will know which employee did it, at which time and through which door they went through to leave the building. This lets the casino know who to call, so the key can be returned. Today the casino must re-key all of the slot machines if the master keys are lost. This PDK in association with the master key will limit the ability for the key to be lost because it can be found by looking at the asset location administration terminal.

Alternate wireless technologies may be used including Ultra Wide Band (UWB) frequencies.

The foregoing description, for purposes of explanation, uses specific nomenclature and formula to provide a thorough understanding of the invention. It should be apparent to those who are skilled in the art that the specific details are not required in order to practice the invention. The embodiments have been chosen and described to best explain the principles of the invention and its practical application, thereby enabling others of skill in the art to utilize the invention, and various embodiments with various modifications, as are suited to the particular use contemplated. Thus, the foregoing disclosure is not intended to be exhaustive or to limit the invention to the precise forms disclosed, and those of skill in the art recognize that many modifications and variations are possible in view of the above teachings.

What is claimed is:

1. A networked gaming system for one or more casino venues comprising:
    a location tracking server;
    a plurality of gaming machines;
    a network;
    a plurality radio frequency transceivers located in said plurality of gaming machines, each radio frequency transceiver device having a known location within said one or more casino venues and each radio transceiver in communication over said network with said location tracking server;
    a set of personal data key devices (PDKs) associated and transported with a player or employee, said radio frequency transceivers configured to wirelessly detect the presence of a PDK in proximity of one or more of said radio frequency transceivers, and
    a location monitor including a video display and a processor, said processor connected to said network and configured to (i) control said display to display a graphical user interface (GUI) including a geographical representation of the layout of at least a portion of said one or more casino venues, (ii) to determine the geographical position of one more PDKs detected by said radio frequency transceivers, (iii) to control said GUI to indicate in said geographical representation the positions of said PDKs in said venues, and (iv) to display a layout of a casino floor which include real-time tracking of PDK devices, radio receiver/decoder (RDC) devices and location of several zones of the RDC devices.

2. The networked gaming system of claim 1 comprising a proximity detector associated with one or more radio frequency transceivers to determine the location proximity of PDKs to said one or more radio frequency transceivers, said location proximity provided by one of said proximity detector and radio frequency transceivers through the network to said monitor.

3. The networked gaming system of claim 1 comprising said radio frequency transceiver devices are located in each of said plurality of gaming machines.

4. The networked gaming system of claim 3 comprising a device including a radio frequency transceiver retrofit into one or more existing gaming machines of said plurality of gaming machines.

5. The networked gaming system of claim 1 comprising said PDKs include a plurality of subsets of PDKs associated with different player or employee characteristics, said monitor processor configured to control said display to distinguish between PDKs of said different subsets.

6. The networked gaming system of claim 1 comprising one or more servers including player or employee information, said monitor in communication with said one or more servers over said network and said processor configured to display for a PDK at least a portion of said player or employee information.

7. The networked gaming machine of claim 6 comprising said monitor configured to provide for selection of a PDK located and displayed in said geographical representation, said selection controlling said processor to control said display to display at least said portion of said player or employee information associated with said selected data key devices.

8. In a gaming system of the type having a plurality of gaming machines dispersed throughout one or more casino venues, a communication network to provide communication between said gaming machines and one or more network servers, an improvement comprising:
 a plurality of radio frequency transceiver devices located in a plurality of said gaming machines, each radio frequency transceiver device having a known location within said one or more casino venues and each radio frequency transceiver in communication over said communication network with a location tracking server;
 a set of personal data keys devices (PDKs) associated and transported with a player or employee, said radio frequency transceivers configured to wirelessly detect the presence of a PDK in proximity of one or more of said radio frequency transceiver;
 a location monitor including a video display and a processor, said processor connected to said network and configured to (i) control said display to display a graphical user interface (GUI) including a geographical representation of the layout of at least a portion of said one or more casino venues, (ii) to determine the geographical position of one or more PDKs detected by said radio frequency transceiver, (iii) to control said GUI to indicate in said geographical representation the positions of said PDKs in said venues, and (iv) to display a layout of a casino floor which include real-time tracking of PDK devices, radio receiver/decoder (RDC) devices and location of several zones of the RDC devices.

9. A method for locating a position of one or more players comprising:
 connecting a plurality of radio frequency transceiver devices to a communication network, said radio frequency transceiver devices distributed about said one or more venues and each radio frequency transceiver device having a known location within said one or more venues;
 providing for personal data keys (PDKs) to said persons, configuring said radio frequency transceiver devices to wirelessly detect the presence of a PDK and sent detection signals through the communication network;
 processing signals, by a processor of a location monitor including a video display, from said radio frequency transceiver devices to (i) display a graphical user interface (GUI) including a geographical representation of the layout of at least a portion of said one or more venues, (ii) determine the geographical position of one or more PDKs detected by said radio frequency transceiver devices, (iii) to control said GUI to indicate in said geographical representation the positions of said PDKs in said venues, and (iv) to display a layout of a casino floor which include real-time tracking of PDK devices, radio receiver/decoder (RDC) devices and location of several zones of the RDC devices;
 wherein, said processor is connected to said network.

10. The method of claim 9 comprising associating each player PDK with a player data file stored at a server and processing said signals from said radio frequency transceiver devices to control said GUI to display a color code associated with at least one PDK to indicate a characteristic of the player associated with the PDK.

11. The method of claim 9 comprising processing said signals from said radio frequency transceiver devices to control said GUI to display selected data of the player data file associated with the PDK selected in the display.

* * * * *